US012744259B2

(12) United States Patent
Huang et al.

(10) Patent No.: US 12,744,259 B2
(45) Date of Patent: Sep. 22, 2026

(54) SYSTEM AND METHODS FOR DETECTING AND MITIGATING LITHIUM PLATING

(71) Applicant: The Board of Trustees of the Leland Stanford Junior University, Stanford, CA (US)

(72) Inventors: Wenxiao Huang, Stanford, CA (US); Yi Cui, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 747 days.

(21) Appl. No.: 18/003,661

(22) PCT Filed: Jun. 30, 2021

(86) PCT No.: PCT/US2021/039787
§ 371 (c)(1),
(2) Date: Dec. 28, 2022

(87) PCT Pub. No.: WO2022/006214
PCT Pub. Date: Jan. 6, 2022

(65) Prior Publication Data

US 2023/0246254 A1 Aug. 3, 2023

Related U.S. Application Data

(60) Provisional application No. 63/047,139, filed on Jul. 1, 2020.

(51) Int. Cl.
*H01M 10/44* (2006.01)
*H01M 10/0525* (2010.01)
(Continued)

(52) U.S. Cl.
CPC ....... *H01M 10/44* (2013.01); *H01M 10/0525* (2013.01); *H01M 10/48* (2013.01); *H01M 50/105* (2021.01); *H01M 2220/20* (2013.01)

(58) Field of Classification Search
CPC ............... H01M 10/44; H01M 10/445; H01M 10/0525; H01M 10/052
See application file for complete search history.

(56) References Cited

U.S. PATENT DOCUMENTS

2014/0333312 A1 11/2014 Schlag et al.
2017/0203667 A1* 7/2017 He .......................... B60L 58/21
(Continued)

OTHER PUBLICATIONS

Bitzer, B. et al. (Sep. 2014). "A new method for detecting lithium plating by measuring the cell thickness," *J. Power Sources* 262:297-302.

(Continued)

*Primary Examiner* — Julian D Huffman
*Assistant Examiner* — Sadia Kousar
(74) *Attorney, Agent, or Firm* — LUMEN PATENT FIRM

(57) ABSTRACT

A system for battery charging includes at least one processor; and at least one memory including instructions which when executed causes the at least one processor to a least: determine, based on a first output from a charging source and a second output from a pressure sensor, a differential pressure with respect to charge. Such systems are applicable to methods of charging batteries and can be used in charging batteries in electric cars and mobile devices.

25 Claims, 13 Drawing Sheets

(51) Int. Cl.
*H01M 10/48* (2006.01)
*H01M 50/105* (2021.01)

(56) References Cited

U.S. PATENT DOCUMENTS

2017/0324122 A1* 11/2017 Poirier .................. H01M 50/44
2019/0181652 A1* 6/2019 Komiyama ............... H02J 7/14

OTHER PUBLICATIONS

Burns, J. C. et al. (2015). "In-situ detection of lithium plating using high precision coulometry," *J. Electrochem. Soc*. 162(6):A959-A964.
Campbell, I. D. et al. (2019). "How observable is lithium plating? Differential voltage analysis to identify and quantify lithium plating following fast charging of cold lithium-ion batteries," *J. Electrochem. Soc*. 166(4):A725-A739.
Cannarella, J. et al. (Jan. 1, 2014). "Stress evolution and capacity fade in constrained lithium-ion pouch cells," *J. Power Sources* 245:745-751.
Chu, Z. et al. (2018). "Testing lithium-ion battery with the internal reference electrode: An insight into the blocking effect," *J. Electrochem. Soc*. 165(14):A3240-A3248.
Downie, L. E. et al. (Feb. 5, 2013). "In situ detection of lithium plating on graphite electrodes by electrochemical calorimetry," *J. Electrochem. Soc*. 160(4):A588-A594.
Gallagher, K. G. et al. (Oct. 17, 2012). "A volume averaged approach to the numerical modeling of phase-transition intercalation electrodes presented for $Li_xC_6$," *J. Electrochem. Soc*. 159(12):A2029-A2037.
He, Y. et al. (Oct. 14, 2019). "Origin of lithium whisker formation and growth under stress," *Nat. Nanotechnol*. 14:1042-1047.
Koyama, Y. et al. (Jan. 10, 2006). "Harnessing the actuation potential of solid-state intercalation compounds," *Adv. Funct. Mater*. 16(4):492-498.
Li, Y. et al. (Oct. 17, 2018). "Correlating Structure and Function of Battery Interphases at Atomic Resolution Using Cryoelectron Microscopy," *Joule* 2(10):2167-2177.
Lin, D. et al. (Mar. 7, 2017). "Reviving the lithium metal anode for high-energy batteries," *Nat. Nanotechnol*. 12:194-206.
Liu, Y. et al. (Jun. 3, 2019). "Challenges and opportunities towards fast-charging battery materials," *Nat. Energy* 4:540-550.
Louli, A. J. et al. (Mar. 20, 2019). Operando Pressure Measurements Reveal Solid Electrolyte Interphase Growth to Rank Li-Ion Cell Performance. *Joule* 3(3):745-761.
Maire, P. et al. (Sep. 25, 2008). "Colorimetric determination of lithium content in electrodes of lithium-ion batteries," *J. Electrochem. Soc*. 155(11):A862-A865.
McKinsey & Company (Jan. 4, 2017). "Electrifying insights: How automakers can drive electrified vehicle sales and profitability," located at <https://www.mckinsey.com/industries/automotive-and-assembly/our-insights/electrifying-insights-how-automakers-can-drive-electrified-vehicle-sales-and-profitability#/> 3 pages.
Missyul, A. et al. (2017). "XRD study of phase transformations in lithiated graphite anodes by Rietveld method," *Powder Diffr*. 32, Supplement 1, S56-S62.
Ren, D. et al. (2018). "Investigation of lithium plating-stripping process in Li-ion batteries at low temperature using an electrochemical model," *J. Electrochem. Soc*. 165:A2167-A2167.
Shahan, Z. (Dec. 5, 2019). "Tesla Model 3=⅛ Of World's EV Sales In 2019," located at <https://cleantechnica.com/2019/12/05/tesla-model-3-13-percent-world-ev-sales-2019/>, 13 pages.
Shi, F. et al. (Nov. 14, 2017, e-published Oct. 30, 2017). "Strong texturing of lithium metal in batteries," *PNAS USA* 114(46):12138-12143.
Spingler, F. B. et al. (Jul. 31, 2018). "Optimum fast charging of lithium-ion pouch cells based on local volume expansion criteria," *J. Power Sources* 393:152-160.
Wang, Q. et al. (Jun. 15, 2012). "Thermal runaway caused fire and explosion of lithium ion battery," *J. Power Sources* 208:210-224.
Wang, C. et al. (Apr. 2016). "Failure prediction of high-capacity electrode materials in lithium-ion batteries," *J. Electrochem. Soc*. 163(7):A1157-A1163.
Yang, X.-G. et al. (Jul. 10, 2018, e-published Jun. 25, 2018). "Fast charging of lithium-ion batteries at all temperatures," *PNAS USA* 115(28):7266-7271.
Yin, X. et al. (Aug. 2018). "Insights into morphological evolution and cycling behaviour of lithium metal anode under mechanical pressure," *Nano Energy* 50:659-664.

* cited by examiner

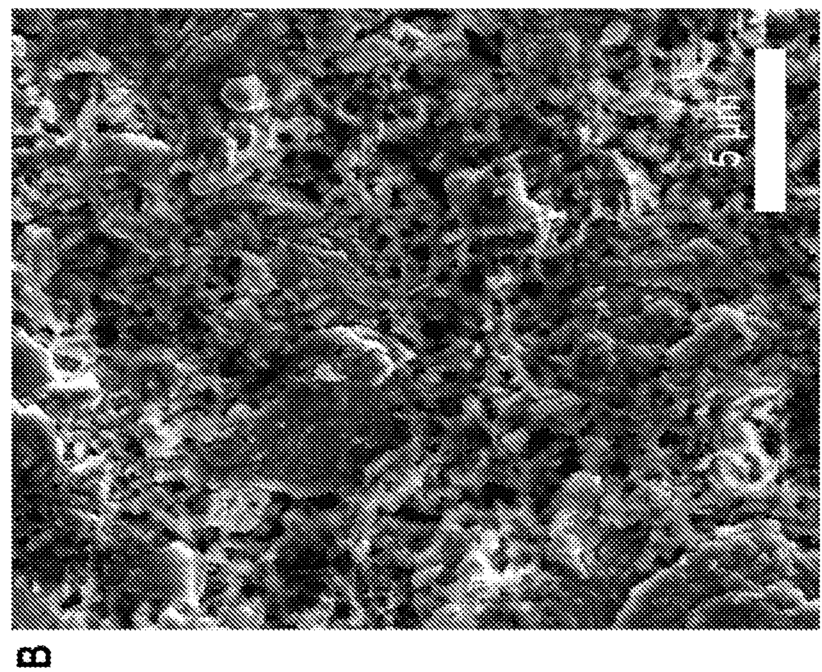
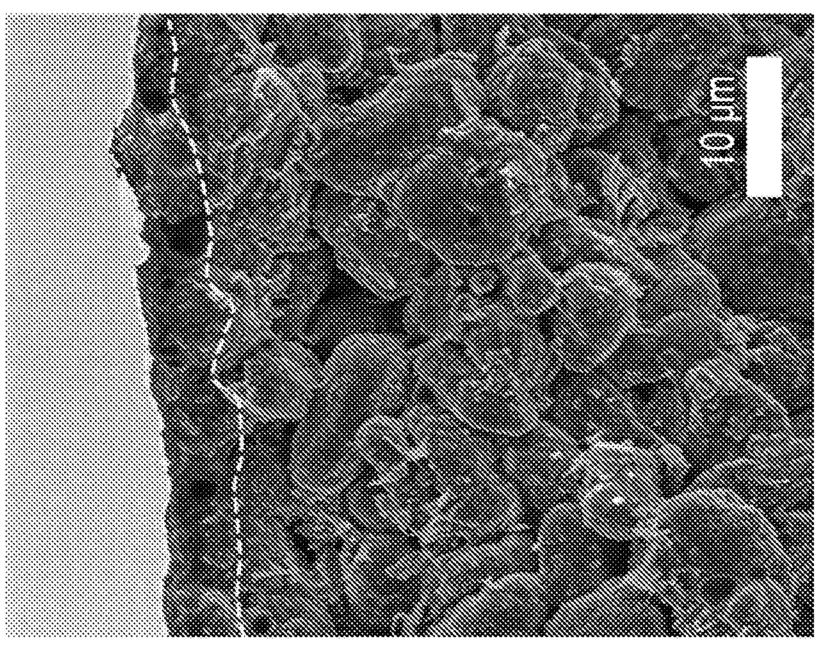
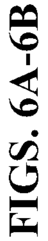
FIGS. 6A-6B

SYSTEM AND METHODS FOR DETECTING AND MITIGATING LITHIUM PLATING

CROSS-REFERENCE TO RELATED APPLICATION

This application is a national phase entrust of Patent Cooperation Treaty Application PCT/US21/39787 filed Jun. 20, 2021, entitled "SYSTEM AND METHODS FOR DETECTING AND MITIGATING LITHIUM PLATING," which claims priority to U.S. Provisional Patent Application No. 63/047,139, filed Jul. 1, 2020, entitled "SYSTEM AND METHODS FOR DETECTING AND MITIGATING LITHIUM PLATING," the disclosures of which are incorporated herein by reference in their entirety.

BACKGROUND

Fast-charging capability is considered an important factor to accelerate the mainstream adoption of electric vehicles (EVs). Despite being the battery technology of choice for current EVs and mobile electronics, lithium-ion batteries (LIBs) show deteriorated electrochemical performance, cell lifetime and safety due to the plating of metallic Lithium (Li) plating on the graphite anode under fast-charging condition. Without the onboard detection, lithium ion batteries could only be charged at conservative rates to avoid lithium (Li) plating. Other metal-ion based battery systems exhibit similar issues with plating.

EVs are often considered to be one of the most sustainable forms of transportation, leading many governments to support their adoption with a wide range of policies. Automakers have also been racing to introduce a series of new electric vehicles (EVs) to the market. However, with only 2.2% market registered in 2019 (Shahan, Z. Tesla Model 3=⅛ Of World's EV Sales In 2019. (2019)), EVs are still far from reaching mainstream acceptance. According to McKinsey's EV consumer survey (Company, M. &. Electrifying insights: How automakers can drive electrified vehicle sales and profitability. (2016)), range anxiety, the fear that the battery will run out of power before destination, is a major psychological barrier preventing the large-scale adoption of EVs. This attitude is based on the common experience of refueling a gas-powered car within 10 minutes while comparable EVs' charging times are usually measured in hours.

Fast charging capability has therefore become a highly favored feature for EV manufactures to include in their offerings. The United States Department of Energy (DOE) has also set the goal to enable 15-minute charging time for high energy density lithium ion batteries with charging power leveling from current home charger at about 10 kW to 400 kW (Yang, X.-G., Zhang, G., Ge, S. & Wang, C.-Y. Fast charging of lithium-ion batteries at all temperatures. *Proc. Natl. Acad. Sci.* 115, 7266-7271 (2018); Liu, Y., Zhu, Y. & Cui, Y. Challenges and opportunities towards fast-charging battery materials. *Nat. Energy* (2019) doi:10.1038/s41560-019-0405-3)). However, no EV on market is capable of accepting such high charging power because of current battery technologies.

State-of-art high energy lithium ion batteries utilize graphite as anodes, which has a low electrochemical potential of 80~200 mV vs. $Li/Li^+$ within normal cell operating voltage (Chu, Z. et al. Testing lithium-ion battery with the internal reference electrode: An insight into the blocking effect. *J. Electrochem. Soc.* 165, A3240-A3248 (2018); Gallagher, K. G., Dees, D. W., Jansen, A. N., Abraham, D. P. & Kanga, S. H. A volume averaged approach to the numerical modeling of phase-transition intercalation electrodes presented for LixC6. *J. Electrochem. Soc.* 159, (2012)). Under strenuous charge condition of high C-rate or low temperature, the strong polarization, charge-transfer overpotential, along with sluggish kinetics can push the graphite potential below the $Li/Li^+$ equilibrium potential which triggers Li-plating in preference to Li-intercalation (Liu, Y., Zhu, Y. & Cui, Y. Challenges and opportunities towards fast-charging battery materials. *Nat. Energy* (2019) doi:10.1038/s41560-019-0405-3). Li-plating on graphite anode reduces safety and adversely accelerates capacity fade. Li-plating leads to extensive dendrite formation, which can penetrate through the separator causing an internal short-circuit, resulting rapid heat generation or, even worse, thermal runaway and explosion (Wang, Q. et al. Thermal runaway caused fire and explosion of lithium ion battery. *J. Power Sources* 208, 210-224 (2012)). In addition to the safety hazard, the electrolyte can decompose upon contact with Li metal forming excessive solid electrolyte interface (SEI) (Lin, D., Liu, Y. & Cui, Y. Reviving the lithium metal anode for high-energy batteries. *Nat. Nanotechnol.* 12, 194-206 (2017)). Not all Li deposits can be effectively removed through discharge. Excessive formation of both SEI and dead Li will remove a significant amount of active Li, causing dramatic capacity losses. Accordingly, the realization of fast charging is hampered by the charge at high rates without plating Li. Embodiments described herein are designed to address these and other problem in the art related to metal deposition in metal and metal-ion-based batteries.

SUMMARY

In some aspects, embodiments herein provide systems for battery charging comprising at least one processor and at least one memory including instructions which when executed causes the at least one processor to a least: determine, based on a first output from a charging source and a second output from a pressure sensor, a differential pressure with respect to charge.

In some variations, one or more of the features disclosed herein including the following features can optionally be included in any feasible combination. The one or more values of differential pressure with respect to charge may be stored in the at least one memory. The system may further include a battery. The pressure sensor may be mechanically coupled with a portion of the battery. The at least one processor may be electronically coupled with the pressure sensor and the charging source. The battery may include a metal or metal ion selected from group consisting of lithium, sodium, potassium, aluminum, vanadium, iron, cerium, nickel, cadmium, magnesium, zinc, and combinations thereof. The battery may be a lithium ion battery. The battery may be a pouch cell that is expandable. The pressure sensor may be disposed on a surface of the pouch cell. The pressure sensor and the pouch cell may be disposed within a constrained volume by a one or more constraining walls. A metal plate may be disposed between the pouch cell and the pressure sensor. The battery may have a substantially fixed volume. The pressure sensor may be disposed internally in the battery. At least one processor may be further caused to perform one or more measurements to determine a maximum value for differential pressure with respect to charge that is indicative of metal ion plating. The at least one processor may be further caused to at least reduce the rate of charging if a value of a measured differential pressure with respect to charge exceeds the maximum value.

In some aspects, embodiments herein provide methods of charging a battery comprising determining, based on a first output from a charging source and a second output from a pressure sensor mechanically coupled to a battery, a differential pressure with respect to charge, determining a maximum value of differential pressure with respect to charge, and charging at or below the maximum value of differential pressure with respect to charge until the battery has a target state of charge.

In some aspects, embodiments herein provide systems for onboard battery management in an electric vehicle comprising at least one onboard processor and at least one memory including instructions which when executed causes the at least one onboard processor to a least determine, based on a first output from a charging source and a second output from a pressure sensor mechanically coupled to a rechargeable car battery, a differential pressure with respect to charge, wherein the at least one onboard processor carries out instructions to determine a differential pressure with respect to charge based on output form the pressure sensor and the charging source during charging, and wherein values of the differential pressure with respect to charge are stored in the at least one memory.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the virtualization of configuration data, it should be readily understood that such features are not intended to be limiting. The claims that follow this disclosure are intended to define the scope of the protected subject matter.

BRIEF DESCRIPTION OF THE FIGURES

FIG. 1*a* shows the configuration of an example of a working pressure measurement system.

FIG. 1*b* shows a zoomed-in schematic of graphite anode illustrating that for the same amount of lithium ions, Li-plating induces a higher volume/pressure than intercalation.

FIG. 1*c* shows the average interplanar lattice spacing of graphite at different lithiation stage agrees with the pressure profile of a 70 mAh lithium nickel manganese cobalt oxide (NMC)-graphite multilayer pouch cell charges and discharges at 0.2 C under which Li-plating is unlikely to happen.

FIG. 1*d* shows the differential pressure with respect to charge (dP/dQ) profile of the cell. The red dash line is the upper bound of dP/dQ during intercalation defining the Li-plating threshold.

FIG. 2*a* shows pressure evolution of a 70 mAh Graphite/NMC532 multilayer pouch cell cycled at different C-rates (upper); the according differential pressure profile (bottom) shows Li-plating detected in 2 C and 3 C charging.

FIG. 2*b* shows optical (left) and the SEM (right) images of the graphite anode after the cycling. The blue and red squre shows the regions with SEI shell and dead Li respectively.

FIG. 2*c* shows the dP/dQ profiles of the cell charged at different slow charing rates have similar maximum and stay below the defiend threshold throughout the entire charging period.

FIG. 2*d* shows the dP/dQ profiles of the cell charged at fast charging rate (2 C and 3 C) go beyond the threshold indicating Li-plating.

FIG. 2*e* shows the pressure and the charged capacity profile at 3 C charge/discharge shows that when there is Li-plating, the pressure reaches maximum before the capacity does. The misalignment of these two peaks causes the negative portion of the dP/dQ during charging.

FIG. 4*a* shows a 200 mAh comercial battery with rolled graphite/NMC532 electrodes cycled at 1 C under 30° and 0° without dynamic regulating, dP/dQ displays Li-plating triggerd by low temperature.

FIG. 4*b* shows a scheme for self-regulated charging. BMS calculates and monitors the real-time dP/dQ value, when it senses Li-plating, the current is modulated to extinguish the plating.

FIGS. 4*c-d* show a 200 mAh commercial cell cycled at 1 C under 30° and 0° with dynamic regulation of a battery management system indicating Li-plating is effectively contained.

FIG. 4*e* shows optical images of the cycled graphite anodes at charged state. Without dynamic regulating, the anode surface is coverd by a thick layer of Li metal; with dynamic regualting, the anode shows a golden color, known as lithiated graphite in $LiC_6$ phase.

FIG. 5*a* shows a lab-made 70 mAh multilayer graphite/NMC532 pouch cell with a core size of 1 inch by 1 inch.

FIG. 5*b* shows a cell with 200 mAh capacity and artificial graphite/NMC532 electrodes.

FIGS. 6*a-b* show SEM of the cross-section and top surface of graphite electrode with Li-plating. A lab-made cell was charged to 4.2V at 3 C to trigger Li-plating.

FIG. 6*a* shows the cross-section of the graphite electrodes shows that though Li nucleation can be observed on the surface of graphite particles across the entire electrode's thickness, the majority of the Li-plating only happens on the top surface of the electrode instead of utilizing the void space between the graphite particles, which induces significant thickness change to the electrodes.

FIG. 6*b* shows a top view of the electrode indicating mossy metallic lithium covering the surface of graphite electrode.

DETAILED DESCRIPTION

Figures 1A, 1B:
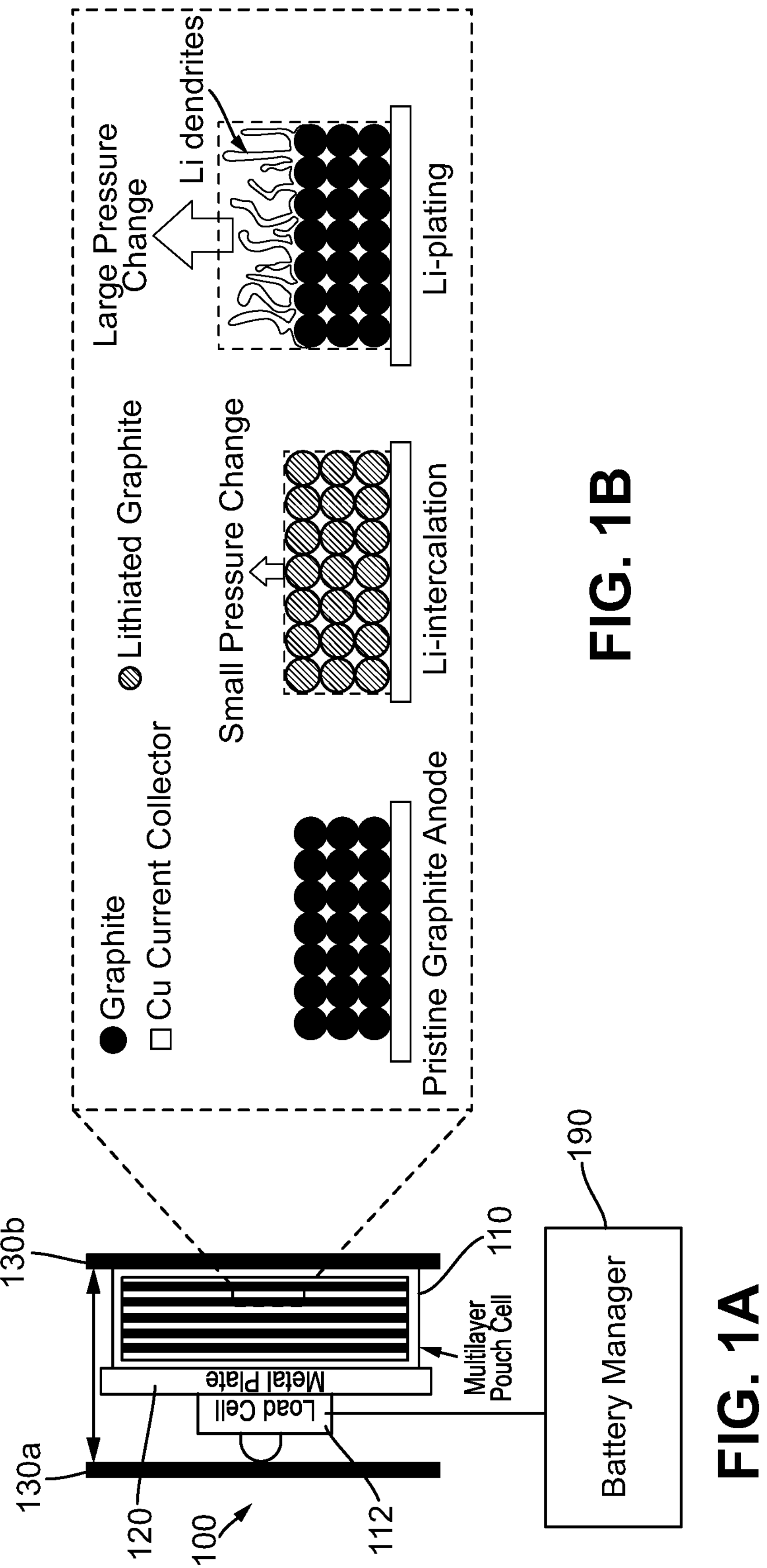
FIGS. 1*a-d* show an example of an embodiment of a set-up and principle of differential pressure sensing for early detection of Li-plating|.

Lithium ion (Li) battery and other metal and metal ion-based battery chemistry is capable of accepting high currents under the ideal conditions. However, practical charging rates are substantially lower in order to prevent metal-plating. Without reliable real-time detection of metal-plating to guide battery management systems, fast charging will carry the risk of catastrophic battery failure. Therefore, operando detection of Li-plating (the most ubiquitous) and other metal-plating is of great significance for onboard (vehicle) applications not only to increase safety, extend battery life, but also to enable fast charging at rates commensurate with the electrochemical limits with confidence. As used herein, "onboard," when used in conjunction with the systems and methods disclosed herein, may refer to the context of a vehicle. It will be appreciated however, that the methods and systems are widely applicable outside of this context. For example, it may be applicable to other forms of transportation including boats, planes, motorcycles, and the like.

In some embodiments, an onboard detection system for Li-plating, specifically, can be configured to meet one or more of the following criteria: 1. it is nondestructive; 2. it is able to detect the onset of Li-plating; 3. it does not change existing cell structure and fabrication; 4. it integrates with battery management system (BMS); and 5. it should be low-cost. Currently, there is no detection technique that fulfills all these requirements. The present embodiments, can fulfill one or more of the noted criteria or goals.

Li-plating, in particular, is very challenging to detect using electrochemical methods, as it exhibits no signal in easily accessible information such as voltage and current in a two-electrode system for practical cells. Though several non-destructive attempts have been devised to detect Li-plating beyond conventional electrochemical measurements, they are not compatible for onboard application: high precision coulometry is reported to detect Li-plating through the fine decline of columbic efficiency (CE) as a result of consumption of active lithium (Burns, J. C., Stevens, D. A. & Dahn, J. R. In-situ detection of lithium plating using high precision coulometry. *J. Electrochem. Soc.* 162, A959-A964 (2015)); microcalorimetry can reveal signature heat flow at the onset of Li-plating (Downie, L. E. et al. In situ detection of lithium plating on graphite electrodes by electrochemical calorimetry. *J. Electrochem. Soc.* 160, 588-594 (2013)). These strategies demand expensive specialized equipment making them more suitable for studies in a laboratory setting.

Another method with potential for onboard detection utilizes the abnormal voltage plateaus during discharge or relaxation immediately after fast charging as an indicator of the existence of metallic lithium. Though this method does not involve special equipment, it only detects the after effects, but not the onset of Li-plating. Moreover, it has been shown that temperature and ionic gradient can falsely introduce voltage plateaus and the absence of plateaus doesn't always confirm the negation of Li-plating (Campbell, I. D., Marzook, M., Marinescu, M. & Offer, G. J. How observable is lithium plating? differential voltage analysis to identify and quantify lithium plating following fast charging of cold lithium-ion batteries. *J. Electrochem. Soc.* 166, A725-A739 (2019)). This indicates a significant knowledge gap to address before this strategy can be applied. It has also noted that irreversible thickness change in the cell has been proposed as an indicator of Li-plating (Bitzer, B. & Gruhle, A. A new method for detecting lithium plating by measuring the cell thickness. *J. Power Sources* 262, 297-302 (2014); Spingler, F. B., Wittmann, W., Sturm, J., Rieger, B. & Jossen, A. Optimum fast charging of lithium-ion pouch cells based on local volume expansion criteria. *J. Power Sources* 393, 152-160 (2018)), however it fails to identify the onset of Li-plating which will be described later.

In some embodiments, there are provided methods and systems based on differential pressure sensing to demonstrate a working non-destructive strategy to detect the onset of Li-plating as early as the nucleation stage, as exemplified in a multilayer pouch cell. Some embodiments may utilize a low-cost external pressure sensor which does not require modification of the existing battery structure and manufacturing process. The present methods may use only a single numerical threshold as a binary classifier to distinguish Li-plating from intercalation, which poses minimal computational stress to the battery management system (BMS). Accordingly, the systems and methods disclosed herein may, in some implementations, provide great potential for onboard integration. Some embodiments disclosed herein may also demonstrate that this strategy can provide a self-modulated charging protocol to avoid catastrophic Li-plating or other metal-plating triggered by, for example, varied environmental conditions.

In some embodiments, a low-cost sensor can be externally attached to mechanically constrained multilayer pouch cells. As demonstrated herein, the system is configured for differential pressure sensing (DPS), which measures the change of cell pressure per unit of charge, whereby Li-plating can be easily detected during nucleation, before hazardous dendrite formation. This differential pressure method goes beyond previous battery pressure configurations, which were only designed to measure the state of charge (SoC) of the battery. Moreover, some embodiments may be adapted to provide DPS into a battery management system (BMS), a dynamic self-regulated charging protocol. Application of the methods and systems disclosed herein may effectively reduce or eliminate Li-plating triggered by charging at low-temperature, while the conventional static charging protocols lead to catastrophic Li-plating. It is expected that the differential pressure sensing systems and methods, as disclosed herein, will also serve as an early nondestructive diagnosis method to accelerate the development of fast-charging battery technologies.

In some embodiments, the methods and systems disclosed herein employ differential pressure sensing (DPS) for detection of Li-plating. The basis for this measurement derives from the observation that electrodes materials expand/shrink during battery cycling. For example, when a cell is charged, the graphite anode expands ~13.1% in volume (4.2% in thickness) while the cathode materials like lithium nickel manganese cobalt oxide (NMC) and lithium cobalt oxide (LCO) contract for 3% and 1% respectively (1% and 0.3% in thickness) (Koyama, Y. et al. Harnessing the actuation potential of solid-state intercalation compounds. *Adv. Funct. Mater.* 16, 492-498 (2006); Louli, A. J., Ellis, L. D. & Dahn, J. R. Operando Pressure Measurements Reveal Solid Electrolyte Interphase Growth to Rank Li-Ion Cell Performance. *Joule* 0, 1-17 (2019)). However, most lithium-ion batteries are confined-volume systems where the cell core is usually mechanically constrained by solid casing, so the volume changes in the battery materials will eventually translate to the pressure change against the wall of the constraints. Since graphite anode changes thickness way exceeding the common cathodes, the full-cell pressure is inherently dominated by the graphite (Louli, A. J., Ellis, L. D. & Dahn, J. R. Operando Pressure Measurements Reveal Solid Electrolyte Interphase Growth to Rank Li-Ion Cell Performance. *Joule* 0, 1-17 (2019) and can directly reveal the electrochemical process on the anode.

During Li-plating for example, Li metal preferentially deposits on the top surface of the anode instead of utilizing the interplanar spacing within the graphite lattice (as shown at FIGS. 6*a-b*) (Wang, C., Ma, Z., Wang, Y. & Lu, C. Failure prediction of high-capacity electrode materials in lithium-ion batteries. *J. Electrochem. Soc.* 163, A1157-A1163 (2016)). Consequently, for the same amount of Li ions, Li-plating causes much larger thickness/pressure increase than intercalation (FIG. 1*b*). For instance, the graphite anode used in the Examples herein, has a coating thickness of 70 μm with an area capacity of 2.84 mAh/$cm^2$. Theoretically, its thickness only increases about 2 μm when the cell is fully charged. In contrast, if the same area capacity is delivered by Li-plating in the dense form, the change of thickness will be at least about 14 μm without even considering the mossy structure of plated Li. Since the change in thickness leads to the change in pressure, Li-plating causes much higher pressure change per unit of charge than intercalation, which can be described by the derivative of pressure with respect to the capacity as shown in Equation 1 where P is the full-cell pressure and Q is the charged capacity. The maximum of dP/dQ during intercalation establishes a threshold to identify Li-plating: dP/dQ will remain under the threshold during intercalation but go beyond the threshold immediately when Li-plating happens.

$$\left(\frac{dP}{dQ}\right)_{plating} > \left(\frac{dP}{dQ}\right)_{intercalation} \quad \text{Equation 1}$$

Figure 10:
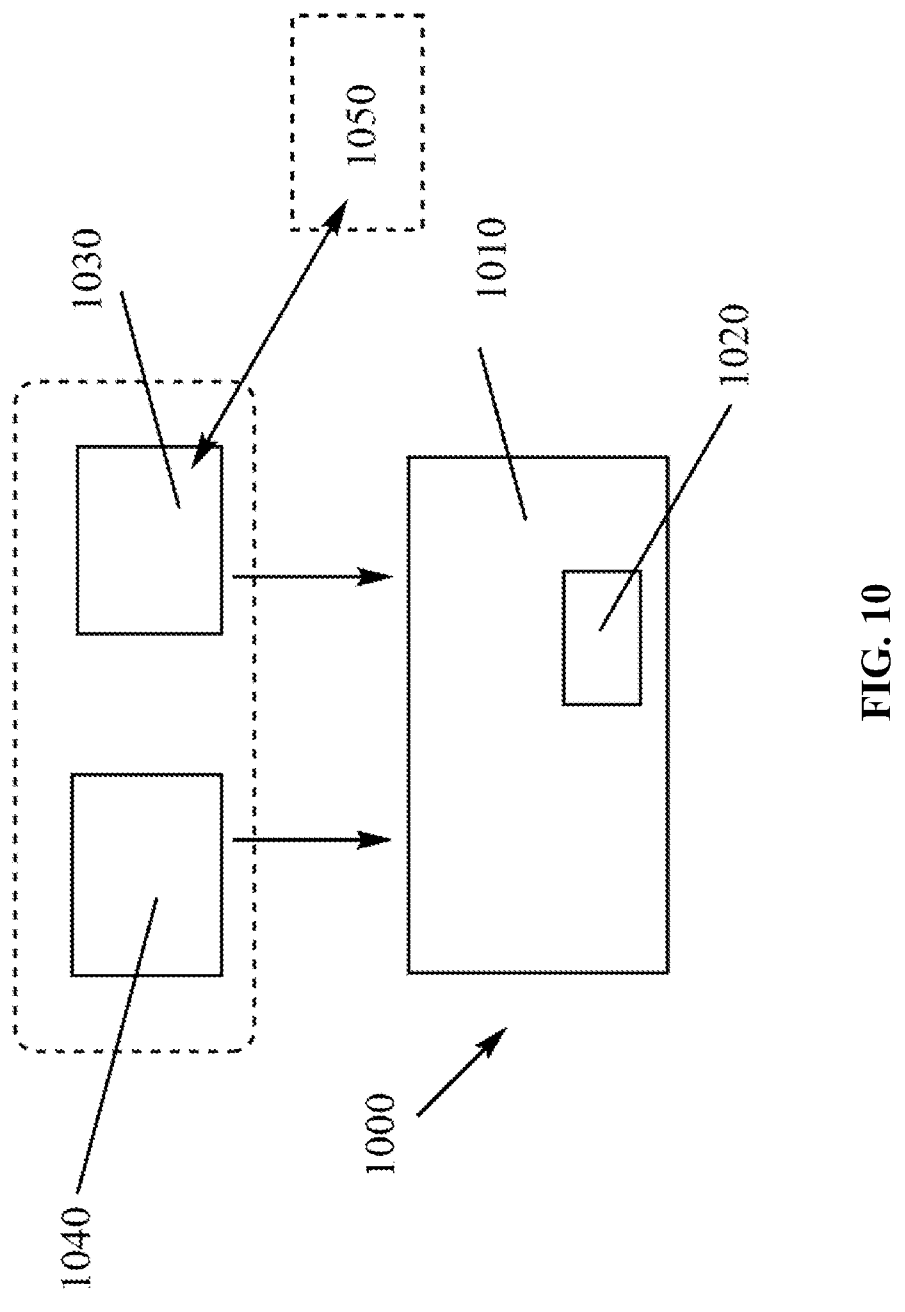
FIG. 10 shows an example of a system for differential pressure measurement versus charge, in accordance with some example embodiments.

In some embodiments, there are provided systems for battery charging comprising at least one processor and at least one memory including instructions which when executed causes the at least one processor to a least: determine, based on a first output from a charging source and a second output from a pressure sensor, a differential pressure with respect to charge (dP/dQ). Turning to FIG. 10, there is shown a system 1000 which comprises at least one processor 1010 equipped with at least on memory 1020. System 1000 is configured to receive input from a pressure sensor 1030, such input being saved to memory as a measurement of pressure in a battery during charging. This measurement may be considered continuous in the sense that measurement is being measured at regular closely spaced intervals. The system 1000 is also configured to receive input from a charging source 1040 indicating the amount of charge being delivered to the battery. The memory comprises instructions to carry out instructions to measure the differential pressure. In some embodiments, the system 1000 can be part of an onboard vehicle processor equipped to monitor the charging of an EV battery. The system 1000 can also be provided independently from a vehicle as a system for measuring any dP/dQ for any rechargeable battery, regardless of the context.

In some embodiments, one or more values of differential pressure with respect to charge are stored in the at least one memory. In a first portion of a battery charging session, instructions in memory 1020 are used to determine a maximum value dP/dQ where the fastest charging rate may occur without causing plating, in accordance with equation 1 above. It will be understood that each charging session can optionally calculate this maximum, which can change over time due to different conditions of charging, such as temperature and natural changes in battery function over its useful lifetime. In some embodiments, the useful lifetime of the battery may be prolonged by avoidance of plating during charging. In some embodiments, the processor can use a maximum from a previous charging session. In some embodiments, the maximum dP/dQ should be relatively constant and accordingly or require recalibration from time to time.

In some embodiments, the system 1000 may further comprise a battery 1050, wherein pressure sensor 1030 is in mechanical communication with a portion of battery 1050, and the at least one processor is in electronic communication with the pressure sensor and the charging source. In some embodiments, battery 1050 may comprise any metal or metal-ion based charging system in which metal plating is potentially problematic. In embodiments, the battery comprises a metal or metal ion selected from group consisting of lithium, sodium, potassium, aluminum, vanadium, zinc, iron, cerium, nickel, cadmium, magnesium, zinc, and combinations thereof. In embodiments, the battery is a lithium ion battery.

In some embodiments, the battery may be a pouch cell that is expandable. Such embodiments are exemplified by the laboratory scale example disclosed herein. In some such embodiments, the pressure sensor is disposed externally on a surface of the pouch cell, and the pressure sensor and the pouch cell are disposed within a constrained volume.

FIG. 1*a* shows an example embodiment of a system 100 for differential pressure sensing. The system 100 may include a pouch cell, such as a multilayer pouch cell 110. In the example of FIG. 1*a*, the multilayer pouch cell 110 is expandable in the sense that the material surrounding the battery cell is flexible allowing for the volume of the pouch cell to expand. Pouch cell 110 is a battery cell encased in a flexible material (pouch) that can accommodate gas, typically referred to as a gas bag. Although FIG. 1*a* depicts a multilayer pouch cell, a single layer pouch cell may be used as well. Pouch cell batteries are frequently employed in mobile devices such as cellular phones and tablets, for example, and the systems and methods disclosed herein are applicable to such devices.

Disposed on top of the multilayer pouch cell 110 is an optional metal plate 120. The metal plate 120 contacts the surface of the pouch cell 110 and its purpose is to evenly distribute pressure to a load cell (112) which interfaces with a processor with memory, such as a battery management system 190.

Disposed on top of the metal plate 120 is a load cell 112. A load cell is a type of pressure sensor. The load cell 112 serves as a pressure sensor for monitoring the pressure changes inside the pouch cell 110. In operation, the expansion of the flexible pouch cell 110 exerts a force on the load cell 112. Provided that the space in which load cell 112 and pouch cell 110 are confined, the load cell 112 can measure the pressure as the pouch cell 110 expands. Note, the pouch cell is configured to accommodate any gas release, which is not recorded as part of the pressure change and only changes in pressure due to either intercalation or plating are potentially recorded. The pouch cell 112 may have a gas bag which is not compressed by external confinement, any gas generated in the cell core may be pushed into this bag by the compression force. Accordingly, gas does not interfere with the pressure measurement. The load cell 112 is coupled to the metal plate 120 and the multilayer pouch cell 110, such that they are in direct contact with each other and metal plate 120 covers the entire surface of pouch cell 110, although the metal plate may cover only a portion of the surface as well. This configuration of pouch cell 110 and metal plate 120 ensures an even force distribution on load cell 112. Load cell can be any sensor such as force sensors, strain gauges, or pressure transducers, for example. Accordingly, the metal plate 120 may be disposed over the entire top surface area of the pouch cell 110 or even slightly past the edges of the pouch cell 110. The metal plate 120 assures an accurate measurement of pressure change via uniform distribution across the surface area of the pouch cell 110.

As indicated in FIG. 1*a*, a load cell 112 (serving as a pressure sensor) is placed in direct contact with metal plate 120. However, this does not prevent the existence of intermediate layers of material between load cell 112 and metal plate 120. An interfacial layer disposed between load cell 112 and pouch cell 110 can include various materials including a thermal interface material, which may serve as a cooling manifold; it can also be a layer of reinforcement material, which improves the cell strength and stability.

In the example of FIG. 1*a*, the pouch cell 110, metal plate 120, and load cell 112 (which in this example is a pressure sensor) are constrained within a substantially fixed volume via constraining walls 130*a* and 130*b*. It will be appreciated that by "substantially fixed volume," it is meant that there may some deformation on the order of about microns. Constraining walls 130*a*/130*b* are in fixed positions relative to each other and serve to confine load cell 112 and pouch cell 110 causing pressure to be registered by load cell 112. Constraining walls 130*a/b* may include a solid casing in which the pouch cell 110 is placed. The actual structure of constraining walls 130*a*/130*b* is not important in that it need only functionally provide a fixed surface that causes the pressure changes to be registered by the load cell 112. Accordingly, when the pouch cell experiences expansion due to pressure changes within the pouch cell, the load cell 112 detects a change in pressure. This change may be signaled by the load cell 112 as an output signal. The output signal may be monitored by battery manager 190 or any other type of computer or processor based device, an example of which is depicted at FIG. 10. The battery manager 190 includes a processor and at least one memory and receives as input the output signal from load cell 112 as well as a charge, as indicated in FIG. 10.

Referring to FIG. 10, there is shown a system 1000 for battery charging that includes at least one processor 1010 and at least one memory 1020 including instructions which when executed causes the at least one processor 1010 (such as battery management system 190, FIG. 1*a*) to a least determine, based on a first output from a charging source 1040 and a second output from a pressure sensor 1030 (such as load cell 112, FIG. 1*a*), a differential pressure with respect to charge.

In some embodiments, one or more values of differential pressure with respect to charge are stored in the at least one memory 1020. The memory 1020 is equipped with instructions that process input signals proportional to rate of charge from charging source 1040 and separately input signals proportional to the rate of pressure change from pressure sensor 1030.

In some embodiments, at least one processor may be further caused to perform one or more measurements to determine a maximum value for differential pressure with respect to charge that is indicative of metal ion plating. The details of an algorithm to measure maximum dP/dQ is provided as follows:

Step 1. Apply a smoothing algorithm on the measured pressure data. There are many smoothing algorithms that exist, such as Simple Moving average, bin smoothing, kernel density, and the like. In some embodiments, the Savitzky-Golay smoothing is used, but it should be understood that the embodiments herein need not be limited by the exact smoothing algorithms.

Step 2. Calculate the gradient of the pressure respect to time (dP/dt).

Step 3. The differential pressure at time point T then achieved by dividing the gradient of pressure by the current I at time T $$\frac{dP(T)}{dQ(T)} = \frac{\frac{dP(T)}{dt}}{\frac{dQ(T)}{dt}} = \frac{\frac{dP(T)}{dt}}{I(T)}$$

Again, this is only one example of calculating maximum dP/dQ and similar mathematical algorithms can provide similar results.

In the early part of the charging process a maximum value of the differential pressure to charge is determined by recording early values at the beginning of the charging process. A curve is generated at the early stage of charging which will have a maximum representing the maximum rate at which charging can be effected without causing plating. In some embodiments, a maximum can be observed before 20% state of charge is achieved. In some embodiments, a maximum can be observed before 15% state of charge is achieved.

In some embodiments, the system 1000 can include a battery 1050 (such as pouch cell 110, FIG. 1*a*), where the pressure sensor 1030 is mechanically coupled with a portion of the battery 1050, and the at least one processor 1010 is electronically coupled (e.g., connected electrically either directly or indirect via other devices) with the pressure sensor 1030 and the charging source 1040. By mechanically coupled, it is meant that sensor 1030 and battery 1050 are either in direct contact with each other or in indirect contact with each other, such as with an intervening plate as shown in FIG. 1*a* (plate 120).

In some embodiments, the battery 1050 (such as pouch cell 110, FIG. 1*a*) includes a metal or metal ion selected from group consisting of lithium, sodium, potassium, aluminum, vanadium, zinc, iron, cerium, nickel, cadmium, magnesium, zinc, and combinations thereof. In some embodiments, the battery 1050 is a lithium ion battery.

In some embodiments, the battery 1050 of system 1000 is a pouch cell that is expandable, such as the multilayer pouch cell 110, shown in FIG. 1*a*. The pouch is expandable in the sense that the material surrounding the multilayer battery cell is flexible allowing for its expansion.

In some embodiments, the pressure sensor 1030 may be a load cell such as shown in FIG. 1*a*, as load cell 112, and is disposed on a surface of the battery 1050. As indicated in FIG. 1*a*, there may also be an optional intervening metal plate 120 between load cell 112 and pouch cell battery 110. As indicated in FIG. 1*a*, the pressure sensor (load cell 112) and the pouch cell 110 are disposed within a constrained volume by a one or more constraining walls 130*a*/130*b*.

In some embodiments, the battery 1050 has a substantially fixed volume and the pressure sensor 1030 is disposed internally in the battery. It will be appreciated that by "substantially fixed volume," it is meant that there may some deformation on the order of about microns. In such embodiments, pressure sensor 1030 is disposed anywhere inside the battery, such as between the cell core and battery shell, or between the electrodes and separator, embedded in the separator or electrodes, or around the electrodes.

In some embodiments, the at least one processor 1010 (such as battery management system 190, FIG. 1*a*) is further caused to perform one or more measurements to determine a maximum value for differential pressure with respect to charge that is indicative of metal ion plating. The maximum value is determined in the early part of charging, such as before 20% state of charge, or about 15% state of charge, or about 5% state of charge.

In some embodiments, the at least one processor 1010 (such as battery management system 190, FIG. 1*a*) is further caused to at least send a signal to the charging source to reduce the rate of charging if a value of a measured differential pressure with respect to charge exceeds the maximum value. The maximum value of the differential pressure with respect to charge is the threshold where lithium or other metal plating occurs. Processor 1010 has memory with instructions to prevent charging beyond this maximum rate.

In some embodiments, there are provided methods of charging a battery 1050 that includes determining, based on a first output from a charging source 1040 and a second output from a pressure sensor 1030 disposed on battery 1050, a differential pressure with respect to charge, determining a maximum value of differential pressure with respect to charge, and charging at or below the maximum value of differential pressure with respect to charge until the battery 1050 has a target state of charge. The processor receives as inputs signals proportional to the rate of charge from charging source 1040 and signals proportional to the rate of pressure changes from the pressure sensor 1030. As these values are stored, they are compared. A maxima is generated in the early stages of charging that is indicative of the maximum differential pressure with respect to charge that can be accommodated without causing metal ion plating.

In some embodiments, the battery 1050 comprises a metal ion selected from group consisting of lithium, sodium, potassium, aluminum, vanadium, zinc, iron, cerium, nickel, cadmium, magnesium, zinc, and combinations thereof. In some embodiments, the battery 1050 is a lithium ion battery. [0001] In some embodiments, the battery is a pouch cell that is expandable as explained herein above.

In some embodiments, the pressure sensor 1030 is disposed externally on a surface of the battery 1050, such as pouch cell battery 110, and the pressure sensor 1030 and the battery 1050 are disposed within a constrained volume by constraining walls 130*a*/130*b*. FIG. 1*a*. shows an alternate embodiments where a metal plate 120 is disposed between the pressure sensor (load cell 112) and the battery (pouch cell 110). The constraining walls 130*a*/130*b* form a sandwich around the pressure sensor and the battery and are in fixed positions that are not mobile when a flexible pouch cell battery expands. Accordingly, pressure builds as the pouch cell expands, transferring pressure to the pressure sensor. The pressure sensor generates an output sent to one or more processors, such as battery management system 190, which record the pressure signal.

In some embodiments, the battery 1050 has a substantially fixed volume and the pressure sensor 1030 is disposed inside the battery. In some embodiments, the substantially fixed volume is provided by a hard casing. As stated elsewhere, it will be appreciated that substantially fixed means that there may still be some deformation on the order of about microns.

In some embodiments, methods may further include sending a signal to the charging source 1040 to reduce the rate of charging if a value of the differential pressure with respect to charge exceeds the maximum value. For example, when a value for a differential pressure with respect to charge indicates that it has exceeded the maximum value, the processor sends out a signal that allows the charging rate to be modulated. Thus, for example, this can be accomplished by reducing the charging current until the differential pressure with respect to charge value falls below the maximum. Likewise, if a value of the differential pressure is well below the maximum value, the processor may optionally be equipped with instructions that allows the charging rate to be increased.

In some embodiments, the charging is continuous. For example, charging can be continued for an uninterrupted period of time until the battery is at full charge. In other words, rather than stopping charging completely because the differential pressure detection system detects the value exceeding the maximum value, the processor instead sends instructions to simply slow the rate of charging. The systems disclosed herein are designed for real-time continuous charging with feedback to maximize the rate of charging.

In some embodiments, there are provided systems 1000 for onboard battery management in an electric vehicle comprising: at least one onboard processor 1010 (such as battery management system 190) equipped with at least one memory 1020. The memory 1020 includes instructions which when executed causes the at least one onboard processor (1010) to a least: determine, based on a first output from a charging source 1040 and a second output from a pressure sensor 1030 mechanically coupled with a rechargeable car battery 1050, a differential pressure with respect to charge; wherein the at least one onboard processor 1010 carries out instructions to determine a differential pressure with respect to charge based on output form the pressure sensor 1030 and the charging source 1040 during charging; and wherein values of the differential pressure with respect to charge are stored in the at least one memory 1020.

In some embodiments, the rechargeable car battery 1050 is a lithium ion battery.

In some embodiments, the rechargeable car battery is a pouch cell that is expandable, such as pouch cell 110 shown in FIG. 1*a* and described herein above.

In some embodiments, the pressure sensor 1030 is disposed externally on a surface of the battery 1050 (pouch cell 110) and the pressure sensor 1030 and the battery 1050 (pouch cell 110) are disposed within a constrained volume by constraining walls 130*a*/130*b*. The configuration of this system is analogous to that described above and in the example and is scalable for use in a car battery management system.

In some embodiments, the battery 1050 has a fixed volume and the pressure sensor 1030 is disposed internally inside the battery 1050.

In some embodiments, the instructions in memory 1020 further cause to be carried out a measurement of a maximum value for the differential pressure with respect to charge, the maximum value indicative of metal ion plating at an initial condition.

In some embodiments, the instructions further cause to be sent a signal to the charging source 1040 to reduce the rate of charging if a value of the differential pressure with respect to charge exceeds the maximum value.

FIG. 1*b* shows example materials and chemistry that occur during the charging process and the pressure changes that can occur during normal charging versus overcharging resulting in lithium plating. In general, metal and metal ion systems can employ electrochemistries that can result in plating. Accordingly, the examples provided herein with respect to lithium ion battery chemistry is expected to apply to any metal or metal ion system.

In some embodiments, the battery 1050 has a fixed volume and the pressure sensor 1030 is disposed internally in the battery. In such embodiments, the pressure sensor is disposed within the battery itself and the walls of the battery are not expanding as in a pouch cell of FIG. 1*a*. The pressure sensor may be disposed conformally about a cathode of the cell in some embodiments. In some embodiments, the pressure sensor may be embedded into the anode or a separator. In some embodiments, it can be embedded between the separator and the electrodes of the battery.

In some embodiments, the at least one processor is further caused to perform one or more measurements to determine a maximum value for differential pressure with respect to charge that is indicative of metal ion plating. In embodiments, the at least one processor is further caused to at least send a signal to the charging source to reduce the rate of charging if a value of a measured differential pressure with respect to charge exceeds the maximum value. In embodiments, the maximum value of dP/dQ is determined at the outset of each charging session. Any global optimization method may be employed to find the maximum dP/dQ, such methods making a determination based on a set of numbers (values) stored in memory.

In some embodiments, there are provided methods of charging a battery including providing a system for battery charging. This system may include at least one processor and at least one memory including instructions which when executed causes the at least one processor to a least: determine, based on a first output from a charging source and a second output from a pressure sensor mechanically linked to a battery, a differential pressure (dP) with respect to differential charge (dQ, the ratio referred to as dP/dQ); determine a maximum value of dP/dQ; and/or charge continuously, or nearly continuously (i.e., with short intervals between measurements), at or below the maximum value of dP/dQ until the battery has a target state of charge (SoC). As used herein, the term "state of charge" is used to indicate the percentage battery charge, with 100% SoC indicating a fully charged battery ready for operation.

In some embodiments, the methods employ a battery comprising a metal or metal ion selected from group consisting of lithium, sodium, potassium aluminum, vanadium, zinc, iron, cerium, nickel, cadmium, magnesium, zinc, and combinations thereof. In some embodiments, the battery is a lithium ion battery. Such battery may be optionally included in a system as indicated in FIG. 10, battery 1050, as described above.

In some embodiments, methods herein may use a battery that is a pouch cell that is expandable, such as that shown in FIG. 1*a* and described above. In such embodiments, as indicated in FIG. 1*a*, the load cell 112 (pressure sensor) is disposed externally on a surface of the pouch cell 110 and the load cell 112 and the pouch cell 110 are disposed within a constrained volume, such as the constraint walls 130*a* and 130*b* of FIG. 1*a*.

In some embodiments, methods may employ a battery having a fixed volume and the pressure sensor is disposed internally in the battery. In some embodiments, the pressure sensor may be a thin film pressure sensor or a force sensor.

In some embodiments, methods may further comprise sending a signal to the charging source to reduce the rate of charging if a value of dP/dQ exceeds the maximum value. This event may be triggered as charging conditions become altered, including changes in temperature, aging of battery, or during acceleration of charging.

In some embodiments, the processor may also be in electronic communication with other condition sensing components during charging, such as temperature. In some such embodiments, where the rate of charging can be improved, e.g., increased, by altering the temperature, a separate subsystem may be provided to modulate temperature to optimize charging conditions. Accordingly, in some embodiments, the battery may be heated to improve charging rates.

In some embodiments, there are provided systems for onboard battery management in an electric vehicle comprising: at least one onboard processor; and at least one memory including instructions which when executed causes the at least one onboard processor to a least: determine, based on a first output from a charging source and a second output from a pressure sensor mechanically linked to a rechargeable car battery, a differential pressure with respect to charge (dP/dQ); wherein the at least one onboard processor carries out instructions to continuously determine a differential pressure with respect to charge (dP/dQ) based on output form the pressure sensor and the charging source during charging; and wherein values of dP/dQ are stored in the at least one memory.

In some embodiments, the onboard systems may comprise a rechargeable car battery is a lithium ion battery, thought other metal or metal-ion-based batteries may also work.

In some embodiments, the rechargeable car battery may be a pouch cell that is expandable, analogous to the examples provided herein. In some embodiments, the pressure sensor is disposed externally on a surface of the pouch cell and the pressure sensor and the pouch cell are disposed within a constrained volume.

In some embodiments, the battery has a fixed volume and the pressure sensor is disposed internally in the battery.

In some embodiments, the instructions further cause to be carried out a measurement of a maximum value for dP/dQ that is indicative of metal plating. In some embodiments, the instructions may further cause to be sent a signal to the charging source to reduce the rate of charging if a value of dP/dQ exceeds the maximum value.

In some embodiments, battery diagnostic information in an onboard system may share data via a display to a user. In some embodiments, the user may be the car dealer, the car owner, a diagnostic specialist at a car dealer or the like. Over time, the information collected may be used to determine the general health of the battery in the vehicle. In some embodiments, data can be stored locally in the vehicle for retrieval later by a mechanic. In other embodiments, the data can be periodically sent via a GPS system to a central diagnostic location where battery health is monitored. In some such embodiments, two-way communication with the central diagnostic location and the driver (vehicle user) may allow pushing of alerts to the driver regarding battery status.

EXAMPLES

Cell Fabrication (Pouch Cell 110)

Both lab-made and commercial cells are used in this study. Nominal 200 mAh $Li[Ni_{0.5}Mn_{0.3}Co_{0.2}]O_2$/graphite 402035-size jelly-roll dry commercial cells were purchased from Li-fun technology. The dry cells were vacuum-sealed during transportation and re-opened in an argon-filled glovebox upon receiving. 700 μL EC/DEC 1M $LiPF_6$ electrolyte was filled into the cell followed by vacuum sealing. For the 70 mAh lab-made cell, single-sided NMC532 and graphite electrodes were fabricated in CAMP facility of Argonne National Laboratory with area capacities of 2.68 $mAh/cm^2$ and 2.84 $mAh/cm^2$ respectively. The electrodes were dried in vacuum for 24 hours before cell making. The NMC532 cathode and graphite anode were cut into 1-inch wide strips then sandwiched with a 25 μm thick PE separator (Celgard 2325) before being folded into 1-inch by 1-inch sized cell core in a zigzag manner. The cell core is then sealed into aluminum laminated pouch cell case with 500 μL EC/DEC 1M $LiPF_6$ electrolyte. Both commercial cell and lab-made cell were rested for 24 hours or longer before a 0.1 C charging/discharging formation cycle between 3V and 4.2V.

Pressure Measurement (FIG. 1*a*)

Figure 5A:
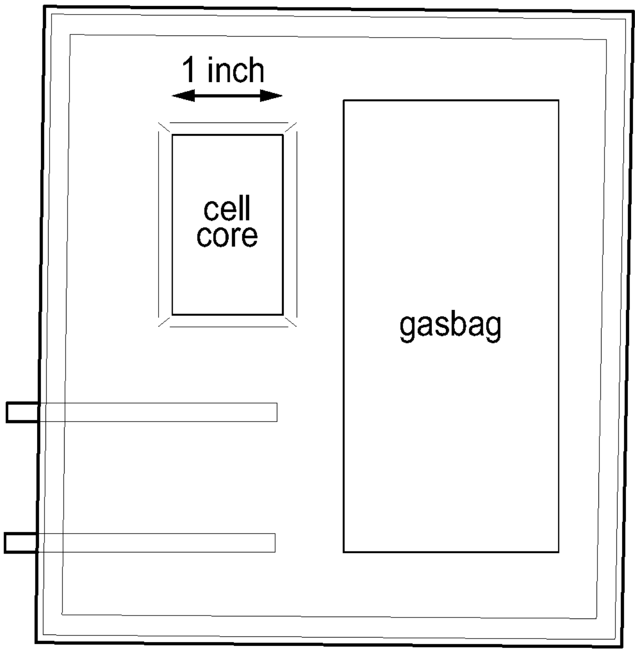
FIG. 5*a-b* shows a photograph of pouch cells with gasbag. Both cells contain gasbag (blue area) to avoid gas generation interference with pressure measurement.
Figure 5B:
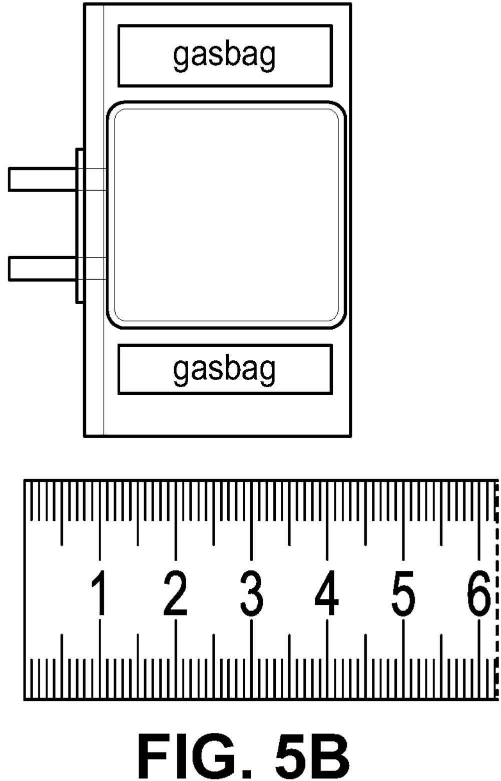

A metal block (metal plate 120, FIG. 1*a*) with a size slightly larger than the cell core was attached to the cell (pouch cell 110, FIG. 1*a*) as force distribution plate. A button-style load cell (112, FIG. 1*a*) (LBC-500, Transducer Techniques) was attached to the metal block (120, FIG. 1*a*). The entire stack was then clamped into a bench vise (serving as constraining walls 130*a*/130*b*, FIG. 1*a*) with an initial ranging from 30 to 50 psi. The cell was rested for at least 12 hours to allow the materials to relax under compression force before cycling. Each pouch contains a gasbag as shown in FIGS. 5*a-b*, any gas generated during battery operation will be pushed into the gas bag due to the compression force applied on the cell, so the pressure measurement was not impacted by any gas generation.

Characterizations

SEM images were taken in NOVA and Magellan scanning electron microscopes. XRD patterns of the graphite anode were recorded on a PANalytical X'Pert instrument. The XRD samples were pealed of from the Cu current collector then sealed with Kapton tape in the argon-filled glovebox beforehand to protect it from the air.

To obtain differential pressure dP/dQ, working cell pressure P is firstly measured on a lab-made 70 mAh 5-layer jelly-roll pouch cell (110, FIG. 1*a*) consisting of graphite anode and NMC532 cathode, with a configuration similar to FIG. 1*b*: (Louli, A. J., Ellis, L. D. & Dahn, J. R. Operando Pressure Measurements Reveal Solid Electrolyte Interphase Growth to Rank Li-Ion Cell Performance. *Joule* 0, 1-17 (2019). The pouch cell (110, FIG. 1*a*) is stacked with a metal force-distribution plate (120, FIG. 1*a*) and a load cell (112, FIG. 1*a*) before being clamped into a bench vise (serving as constraint walls 130*a/b*, FIG. 1*a*) with a fixed thickness. A load cell (112) is a common and cost-effective force sensor. The initial clamping pressure ranges from 20 to 50 psi which was reported to benefit the long-term cycling of graphite/NMC pouch cell (Cannarella, J. & Arnold, C. B. Stress evolution and capacity fade in constrained lithium-ion pouch cells. *J. Power Sources* 245, 745-751 (2014)). The volume expansion of graphite is mainly contributed by the increment in the interplanar lattice distance after Li ion intercalated. To idealize the volume evolution, the average interplanar spacings of graphite lattice were plotted (FIG. 1*c* green curve) at different state or charge (SOC) measured by X-ray diffraction (XRD) (Missyul, A., Bolshakov, I. & Shpanchenko, R. XRD study of phase transformations in lithiated graphite anodes by Rietveld method. *Powder Diffr.* 32, S56-S62 (2017)). It shows agreement with the measured operating pressure (FIG. 1*c* orange curve) of the cell cycled with 0.2 C between 3 V and 4.2 V which confirms that the graphite anode determines the pressure evolution of lithium ion batteries.

Figures 1C, 1D:
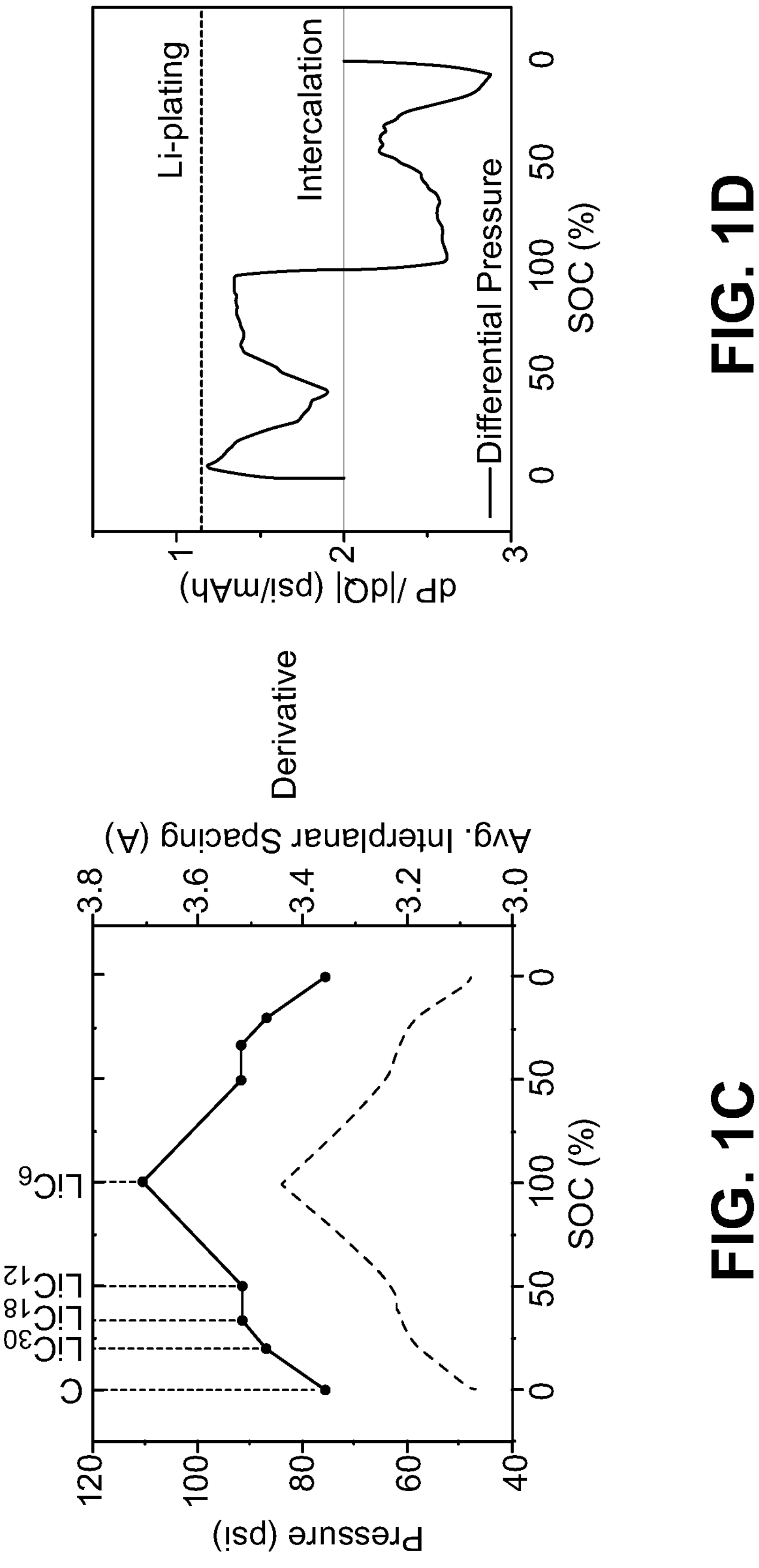

Differential pressure dP/dQ is then calculated and plotted in FIG. 1*d*. The absolute value of dQ is used to guarantee a negative dP/dQ value for discharge so that the charging and discharging period can be easily distinguished. As the charging starts, pristine graphite quickly transits to $LiC_{30}$. This transition has the steepest slope of lattice expansion as shown in FIG. 1*c*, projecting the maximum of dP/dQ which defines the upper bound of Li-intercalation (red dash line in FIG. 1*d*). When the anode undergoes intercalation chemistry, the dP/dQ curve should always stay within the blue region underneath the threshold. As the charging continues, dP/dQ declines to its minimum as the graphite goes through the transition from $LiC_{18}$ to $LiC_{12}$ during which the volume change is negligible. Following the minimum, dP/dQ displays a large plateau in the entire latter half of the charging due to the transition from $LiC_{12}$ to $LiC_6$ which contributes to 50% of the cell capacity. As lithium ion battery known as the rocking chair battery, the intercalation chemistry is highly reversible, so the discharge portion of dP/dQ profile is nearly symmetric to the charging part. Being able to distinguish the transitions between lithiation stages of graphite, DPS shows outstanding capability and sensitivity of identifying different anode electrochemical process. Therefore, when Li-plating happens, dP/dQ can be expected to go beyond the threshold and enter the upper Li-plating region labelled in FIG. 1*d*. In addition, the maximum of dP/dQ locates at the beginning of charging may provide a significant advantage in re-calibrating the system when it is needed in a timely manner. For example, the cell can be charged to 20% SOC with a slow charging rate to re-establish the threshold for Li-plating.

Figure 2A:
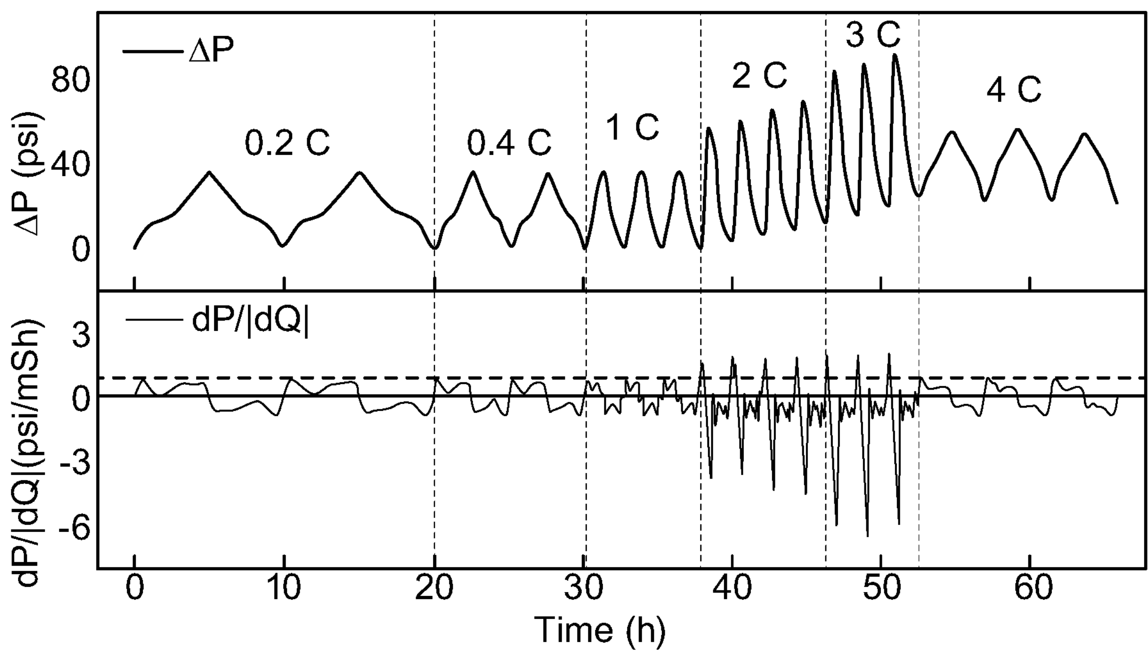
FIGS. 2*a-e* show an example of embodiments of differential pressure sensing to reveal Li-plating during fast charging.
Figure 2B:
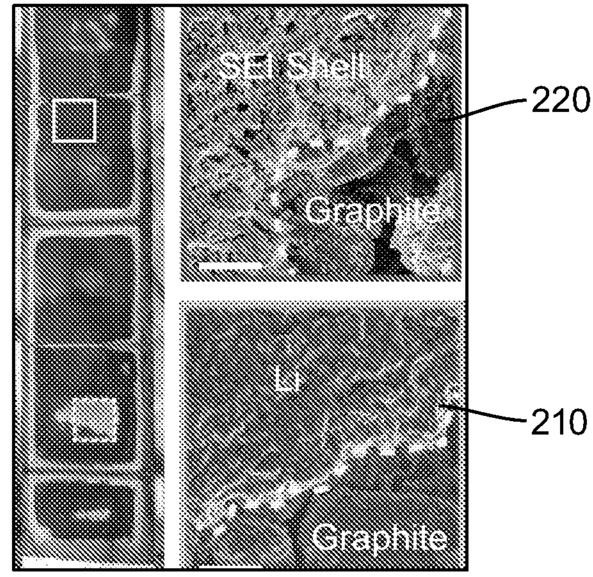

In some embodiments, differential pressure sensing (DPS) reveals Li-plating under fast-charging conditions. Some of the examples provided support that principle. The dP/dQ response in Li-plating event as measured in a lab-made 70 mAh pouch cell is charged and discharged symmetrically between 3 V and 4.2 V at different C-rates with a constant-current constant-voltage (CC-CV) protocol and a cut-off current of 0.1 C. The operando pressure and the associated dP/dQ profiles versus time are presented in FIG. 2*a*. For slow charging rates such as 0.2 C, 0.4 C and 1 C, the dP/dQ profile is enveloped underneath the red dash line which is the Li-plating threshold defined by the maximum of the 0.2 C. Both the pressure and dP/dQ profiles during each charging/discharging cycle are highly symmetric indicating the reversible Li-intercalation chemistry and the absence of Li-plating. In contrast, the symmetry breaks at 2 C and 3 C rates while dP/dQ curve extends beyond the threshold as a result of Li-plating. In addition, the maximal operando pressure and the pressure at the discharged state gradually increases for each cycle which could indicate SEI buildup and dead Li formation associated with Li-plating. Multiple studies have reported that the plated Li is only partially reversible (Ren, D. et al. Investigation of lithium plating-stripping process in Li-ion batteries at low temperature using an electrochemical model. *J. Electrochem. Soc.* 165, A2167-A2167 (2018)). While the reversible portion of the Li can migrate and re-intercalate into the graphite or is stripped during discharge, the irreversible Li electrically isolates from the anode, forming dead Li. Along with the excessive SEI growth due to the reaction between metallic Li and electrolyte, the dead Li adds irreversible thickness to the anode which causes residue pressure after each cycle. The dead Li cannot be retrieved by slower charge/discharge cycles, as the baseline pressure does not recover in the 0.4 C cycles after the fast charging. To visually confirm Li-plating at high C-rates, the discharged cell was disassembled in an argon-filled glovebox for post-mortem analysis. FIG. 2*b* presents both the optical and scanning electron microscopy (SEM) images taken on the graphite anode. On the anode surface, the center and edges of each layer are covered by grey dead Li, display a compact morphology (red square 210, in FIG. 2*b*) which is typical for Li metal deposit under pressure (Yin, X. et al. Insights into morphological evolution and cycling behaviour of lithium metal anode under mechanical pressure. *Nano Energy* 50, 659-664 (2018)). The dark area is covered by a layer of porous film which consists of empty SEI shell after most of the Li deposits are successfully extracted through re-intercalation and discharge (blue square 220 in FIG. 2*b*).

Figures 2C, 2D, 2E:
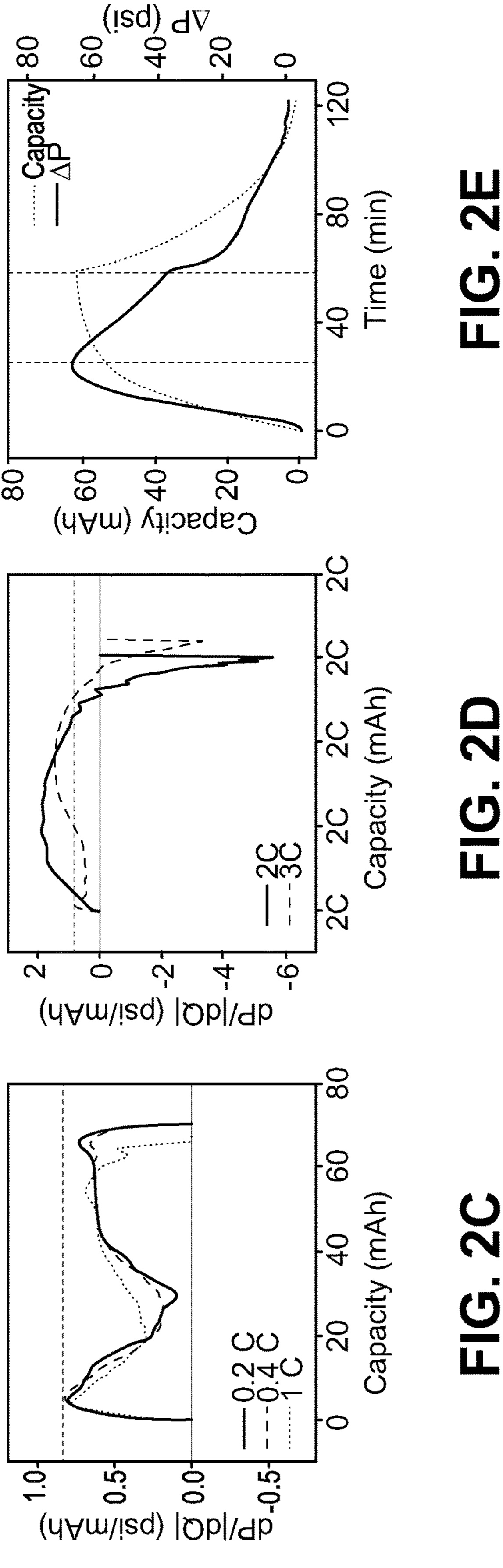

To better understand the characteristics of differential pressure sensing, the dP/dQ profiles of each C-rate during charging are plotted against the charged capacity (FIG. 2*c-d*). FIG. 2*c* shows that for 0.2 C, 0.4 C, and 1 C, all the dP/dQ profiles share the identical maximum value and have very similar evolution. This is because dP/dQ evaluates the pressure change per unit of charge, which is inherently independent to C-rate if there is no Li-plating. This phenomenon carries significant value in practical application: a single dP/dQ profile measured by a charging rate sufficiently low to prevent Li-plating determines a universal Li-plating threshold compatible with all the other charging rates.

For the high charging rates which triggers Li-plating, the associated dP/dQ profiles for different rates are diverse due to the current-dependent Li-plating behavior. As shown in FIG. 2*d,* 3 C reaches the threshold before 2 C and has a higher maximal value in dP/dQ. This indicates that Li-plating under 3 C not only happens earlier but is also more sever comparing to 2 C. Another distinct feature of 2 C and 3 C's dP/dQ profiles is the negative portion near the end of charging. In Li-plating event, two electrochemical processes happen simultaneously: Li-plating, and the migration of Li ion from the metallic Li into the graphite (Ren, D. et al. Investigation of lithium plating-stripping process in Li-ion batteries at low temperature using an electrochemical model. *J. Electrochem. Soc.* 165, A2167-A2167 (2018)). The first process is supplied by the charging current to expand the volume of Li deposits while the later one reduces the volume. With high charging current, Li-plating exceeds the migration into graphite therefore the net volume of the metallic Li expands, increasing the cell pressure. However, when it is close to the end of the charging period, the cell is charged with constant voltage and the current gradually decreases to a point where Li-plating stops or is slower than the migration. Therefore, the net volume of the Li metal shrinks, causing the cell pressure to drop and dP/dQ becoming negative before the charging is complete (FIG. 2*e*). The decline of pressure caused by migration is also measured by holding a cell at charged state after Li-plating. It shows the migration can last for hours as the cell pressure keeps dropping before it finally stabilizes (FIG. 7).

Figure 7:
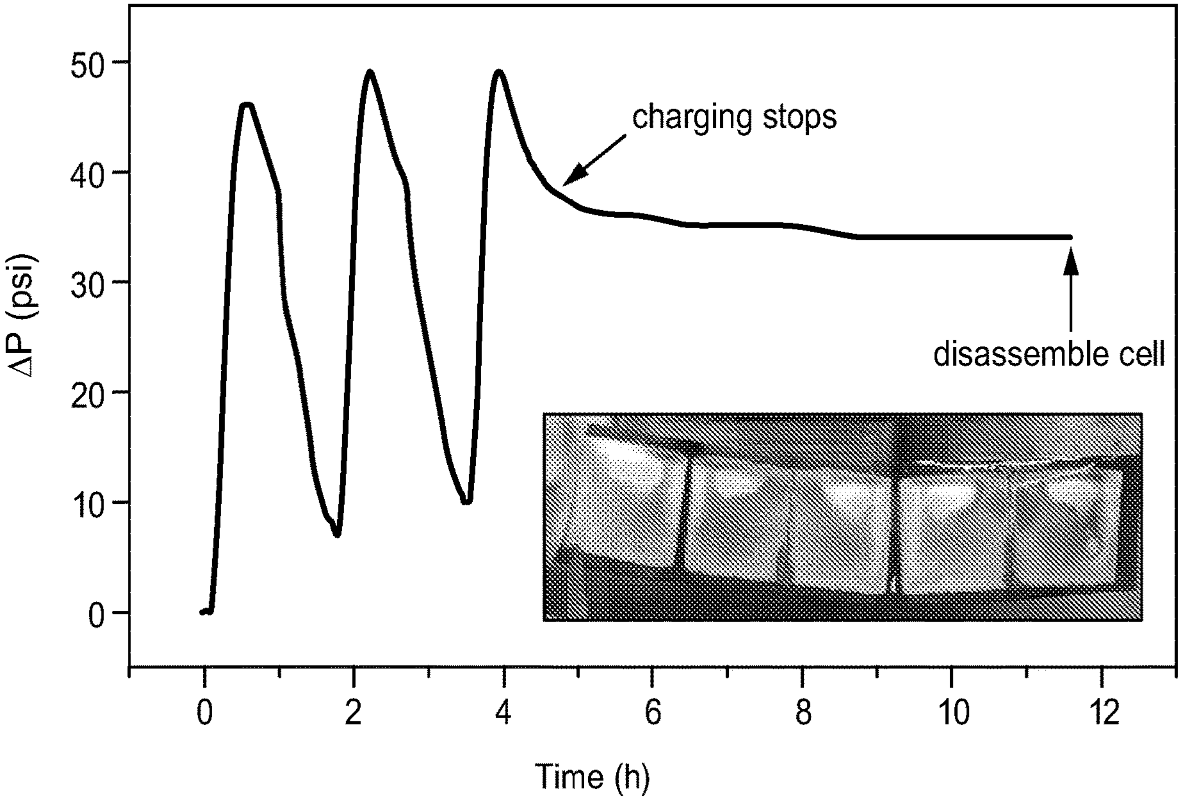
FIG. 7 depicts a pressure profile of the Li-plated cell being held at charged state.

FIG. 7 depicts a pressure profile of the Li-plated cell being held at charged state. After the same cycling shown in FIG. 2, three extra 2 C charges were applied to a lab-made cell to assure Li-plating, the cell was then held at the charged state. The pressure profile shows that after the cycling stops, the pressure keeps decreasing then stabilizes after 8 hours. The pressure drop after charging indicates the plated metallic Li continuously diffuses then re-intercalates into graphite particles until only dead Li remains. The inset optical image shows the dead Li on the surface of graphite after the experiment.

Figure 8:
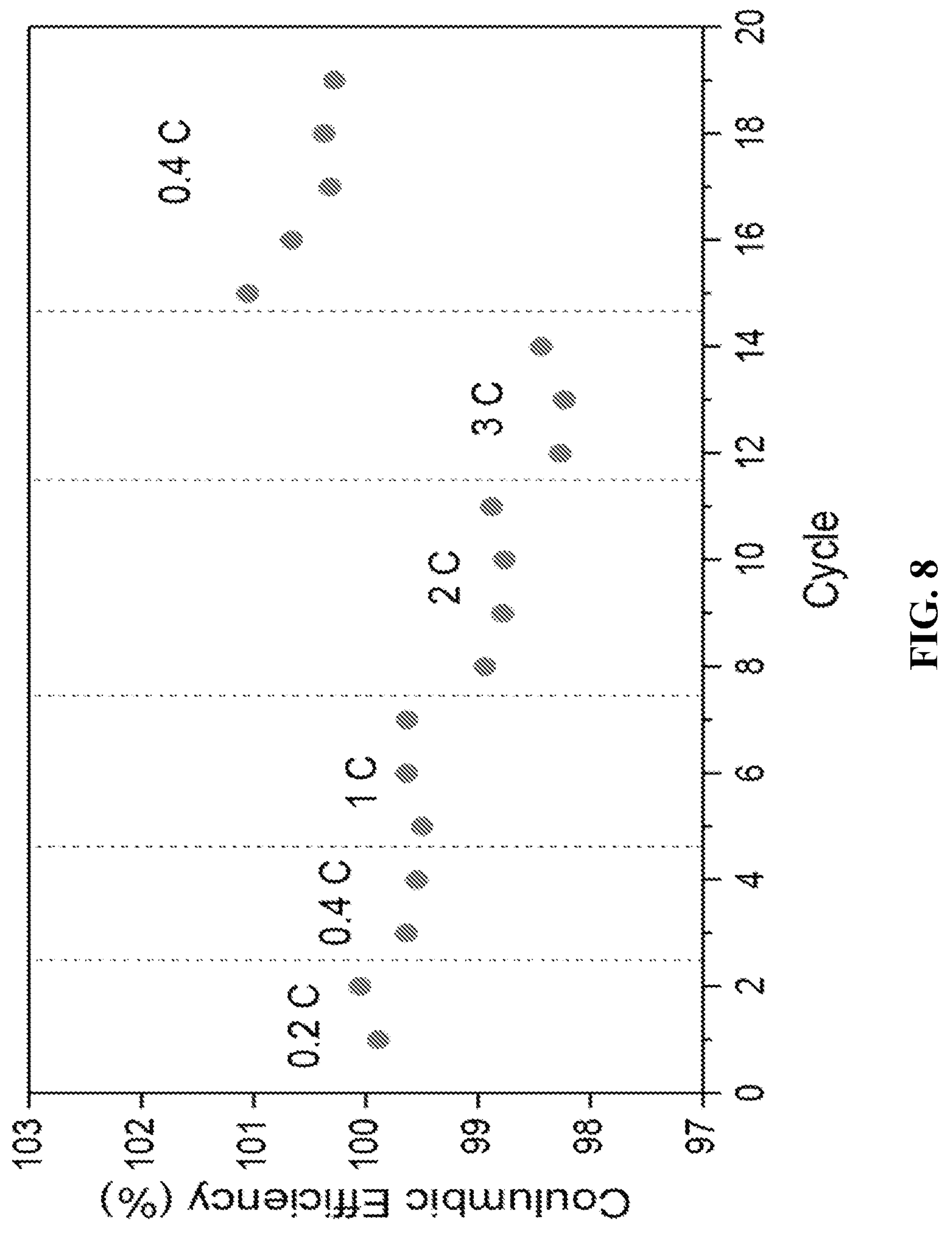
FIG. 8 depicts Coulombic Efficiency (CE) of the cell at different C-rate. CE of the cycling displayed in FIG. 2 of the main text.

FIG. 8 depicts Coulombic Efficiency (CE) of the cell at different C-rate. CE of the cycling displayed in FIG. 2 of the main text. It shows that CE immediately decreases in high-rate cycles such as 2 C and 3 C, where Li-plating happens and removes Li inventory in the ways of dead Li and excessive SEI formation. The 0.4 C cycle after 3 C charging shows CE greater than 100% which indicates part of the plated metallic Li is reversible. Two possible pathways could lead to this reversibility: 1. The graphite particles are pre-lithiated by the plated metallic Li before 0.4 C charging; 2. Part of the plated Li is extracted through discharge of the 0.4 C cycles.

Figures 9A, 9B:
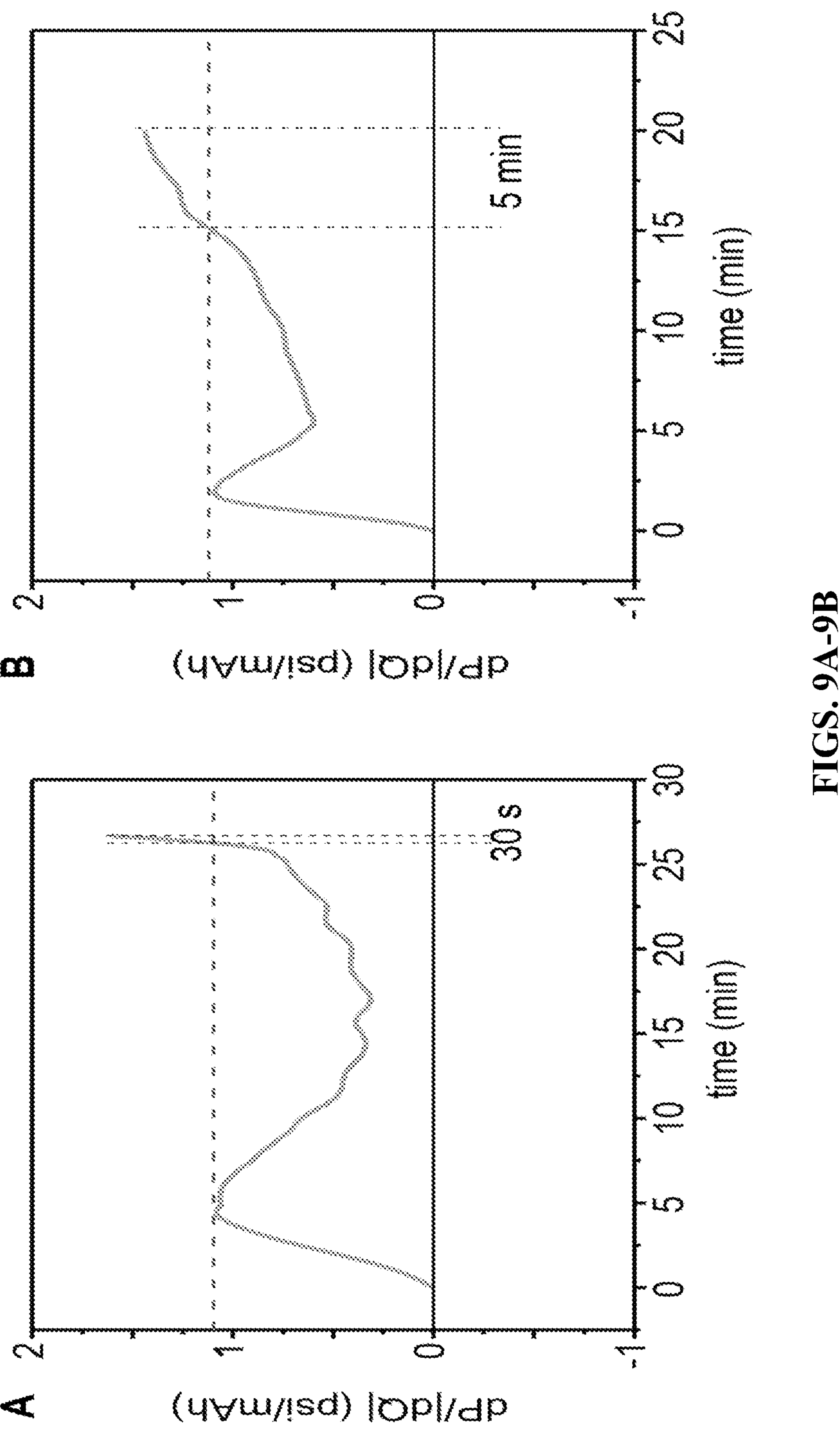
FIGS. 9*a-b* show the dP/dQ profile of cells used for Li-plating morphology. The dP/dQ profiles are those of the cells displayed in FIG. 4.

FIGS. 9*a-b* show the dP/dQ over time profile of cells used for Li-plating morphology. The dP/dQ profiles are those of the cells displayed in FIG. 4. The two cells were disassembled for SEM imaging 30 seconds (s) and 5 min respectively after dP/dQ passes the Li-plating threshold.

The increased maximum cell pressure (or thickness) and the misaligned capacity/pressure peaks may also serve as fingerprints of Li-plating (Bitzer, B. & Gruhle, A. A new method for detecting lithium plating by measuring the cell thickness. J. Power Sources 262, 297-302 (2014); Spingler, F. B., Wittmann, W., Sturm, J., Rieger, B. & Jossen, A. Optimum fast charging of lithium-ion pouch cells based on local volume expansion criteria. J. Power Sources 393, 152-160 (2018)). However, neither of them can resolve the onset of the Li-plating because they can only detect Li-plating when the pressure reaches its peak during the constant-voltage charging region. But Li-plating could have already started way before. Take the presented 3 C case as an example: in FIG. 2*e*, the peak of the pressure is located at late charging stage where the cell is already charged to 53 mAh or 86% SOC respect to the full 3 C capacity. In comparison, the dP/dQ curve passes the Li-plating threshold already at the cell is only charged for 5 mAh or 8.1% SOC. This difference highlights the sensitivity and capability of DPS on early detection of Li-plating.

Figures 3A, 3B, 3C, 3D, 3E, 3F:
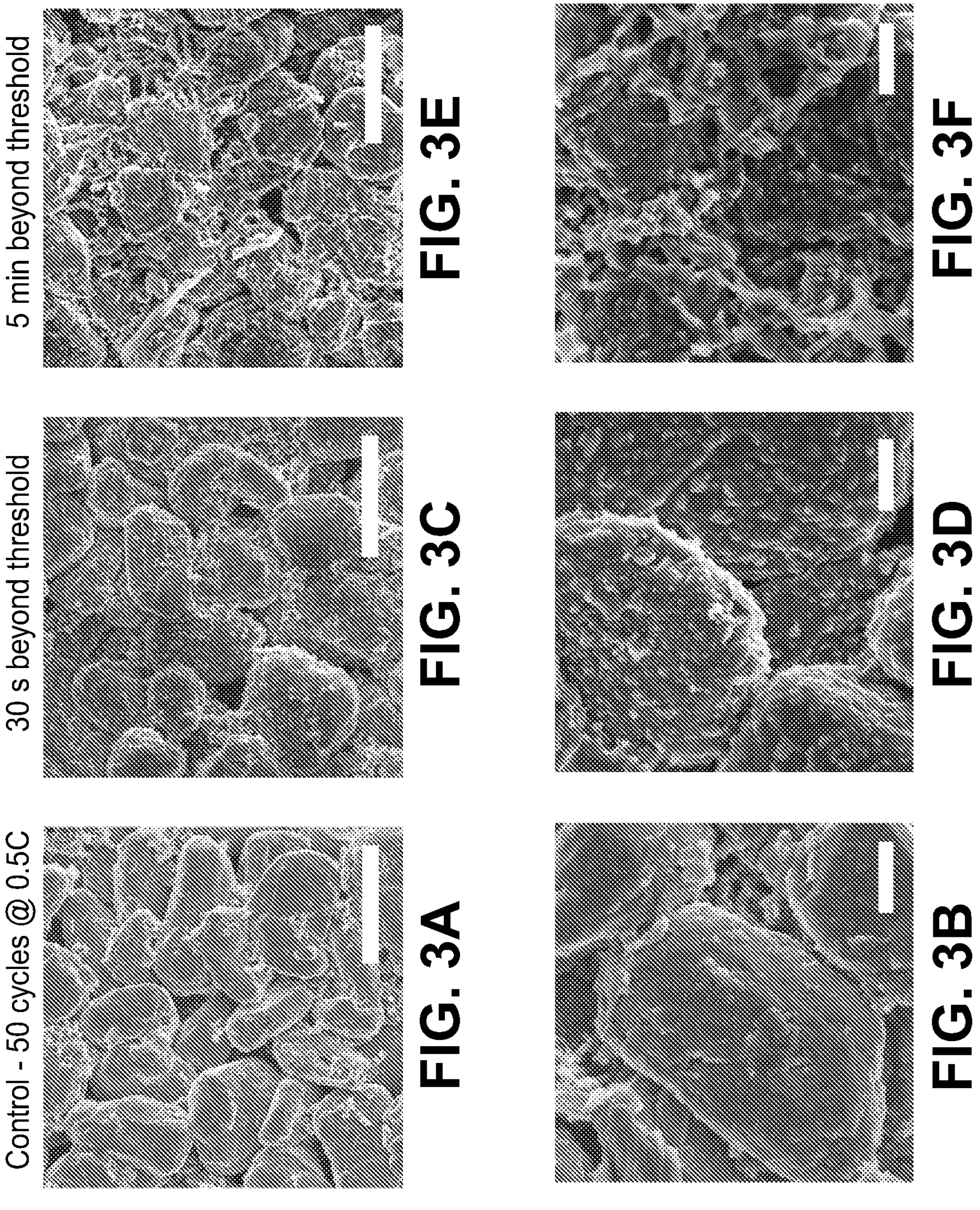
FIGS. 3*a-f* show surface morphology and XRD of graphite anode after dP/dQ passing the Li-plating threshold. SEM images of the top surface of the graphite anode: control sample which was cycled at 0.5 C for 50 cycles without fast charging (FIGS. 3*a-b*); Fast charging was terminated at 30 s (FIGS. 3*c-d*) and 5 min (FIGS. 3*e-f*) after dP/dQ goes beyond Li-plating threshold. Scale bar: 10 μm (FIGS. 3*a, c, e*) and 2 μm (FIGS. 3*b, d, f*).
Figure 3I:
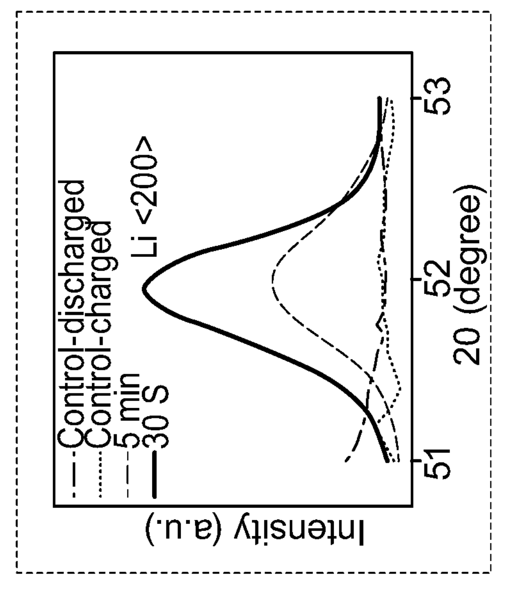
FIG. 3*i* shows the enlarged XRD spectrum near 51.97° shows Li (200) peak intensity increases as the Li-plating continues.
Figure 3H:
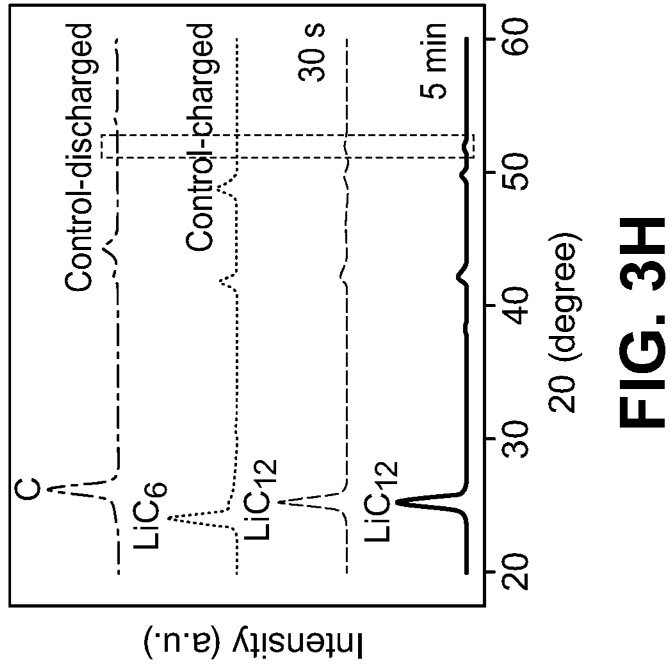
FIG. 3*h* shows the XRD of control samples and fast-charged sample. Both 30 s and 5 min samples resolve a mixture of partially lithiated graphite and metallic Li while the control samples only consist pure graphite (discharge sample) or lithiated graphite (charged sample).

To cross-validate the sensitivity and detection limit of the dP/dQ method, the surface morphology and the composition of the graphite anode after 30 s and 5 min of continuous charging after dP/dQ passing the Li-plating threshold were examined with SEM and XRD. After formation, two cells were firstly cycled at 0.5 C to establish the Li-plating threshold followed by a high-rate (2 C) charging. The fast charging was terminated 30 seconds and 5 minutes respectively after the real-time dP/dQ exceeds the threshold. Then the cells were disassembled for characterization. SEM images of the 30 s sample in FIGS. 3*c-d* show that Li metal nucleates into small nanoparticles covering the surface of graphite particles. In contrast, the control sample which was cycled at 0.5 C for 50 cycles without fast charging has a smooth surface which indicates the nanoparticle structure is not native graphite SEI but correlated to the fast charging process (FIGS. 3*a-b*). In the 5-min sample, though some of the nanoparticles are still observable, typical mossy lithium dendrites start to form on the surface of graphite anode (FIGS. 3*e-f*). The plating of lithium metal is also supported by XRD. For both samples that were charged at fast rates, the associated XRD spectrum presented in FIG. 3*h* resolves a mixture of partially lithiated graphite ($LiC_{12}$) and Li metal. In comparison, the control samples only consist pure graphite when discharged or lithiated graphite ($LiC_6$) when fully charged (Shi, F. et al. Strong texturing of lithium metal in batteries. *Proc. Natl. Acad. Sci.* 114, 12138-12143 (2017); Missyul, A., Bolshakov, I. & Shpanchenko, R. XRD study of phase transformations in lithiated graphite anodes by Rietveld method. *Powder Diffr.* 32, S56-S62 (2017)). The scans near 51.97° are enlarged and replotted in FIG. 3*i* to show that while in the control samples no metallic Li can be detected, the Li (200) peak can be easily identified in the 30 s sample and its intensity increases as the fast charging continues which can be seen in the 5 min sample.

Combining scanning electron microscopy (SEM) and x-ray diffraction (XRD), it has been elucidated that differential pressure sensing can detect the onset of Li-plating as early as nucleation stage. It also reveals that Li-plating is initiated by nucleation of small Li nanoparticles prior to forming dendrites, which agrees with the discovery of the morphological evolution of the electrochemically plated Li under stress (He, Y. et al. Origin of lithium whisker formation and growth under stress. *Nat. Nanotechnol.* 14, 1042-1047 (2019)). It has been reported that the Li metal starts with a sluggish nucleation of Li nanoparticle. Then the spherical particle slowly expands until the dendrite sprouts of the interface between Li particle and electrolyte leading to a rapid anisotropic growth along the longitudinal direction of the dendrite. Because the dead Li formation and the major safety concerns of Li-plating are direct results of the dendritic structure (Li, Y. et al. Correlating Structure and Function of Battery Interphases at Atomic Resolution Using Cryoelectron Microscopy. *Joule* 2, 2167-2177 (2018)), being able to detect Li-plating before the rapid catastrophic dendritic growth provides us a buffer to dynamically modulate the charging current so that subsequent dendritic growth is terminated.

Self-regulated charging enabled by detection of Li-plating with dP/dQ: Developing fast charging protocol remains challenging, given the many factors that rate performance is related to, such as environment where the batteries are being used, the state of degradation, and the heterogeneities within a cell, etc. This challenge is even more pronounced in the context of EVs, considering the wide span of consumers' driving habits and geographical distribution which are all coupling to different cell degradation modes. The extremely large parameter space makes it almost intangible to develop a 'rigid' universal fast-charging protocol which is compatible for all conditions and entire cell lifespan. Currently, it is typical that battery companies only provide a few preset charging protocols which are rigid, reflects little on the environmental variables and the state of degradation. It could eventually trigger Li-plating when variables change and results in rapid cell degradation.

To demonstrate the incompetency of rigid charging protocol, a commercial 200 mAh cell with rolled graphite/NMC532 electrodes was cycled at different controlled temperatures in an environment chamber, using a 1 C CC-CV charging protocol suggested by the manufacturer. As one can see in FIG. 4*a*, the cell cycles normally at 30° C. without Li-plating as the dP/dQ profile is contained by the threshold. However, after the temperature decreases to 0° C., the same charging protocol triggers severe Li-plating which can be concluded from the elevated dP/dQ value. The cell is then disassembled at the charged state after 3 cycles at 0° C., showing that the entire graphite anode is covered by a thick layer of Li metal (FIG. 4*e* camera image, top, gray color as an indication of Li metal).

Figures 4A, 4B, 4C, 4D, 4E:
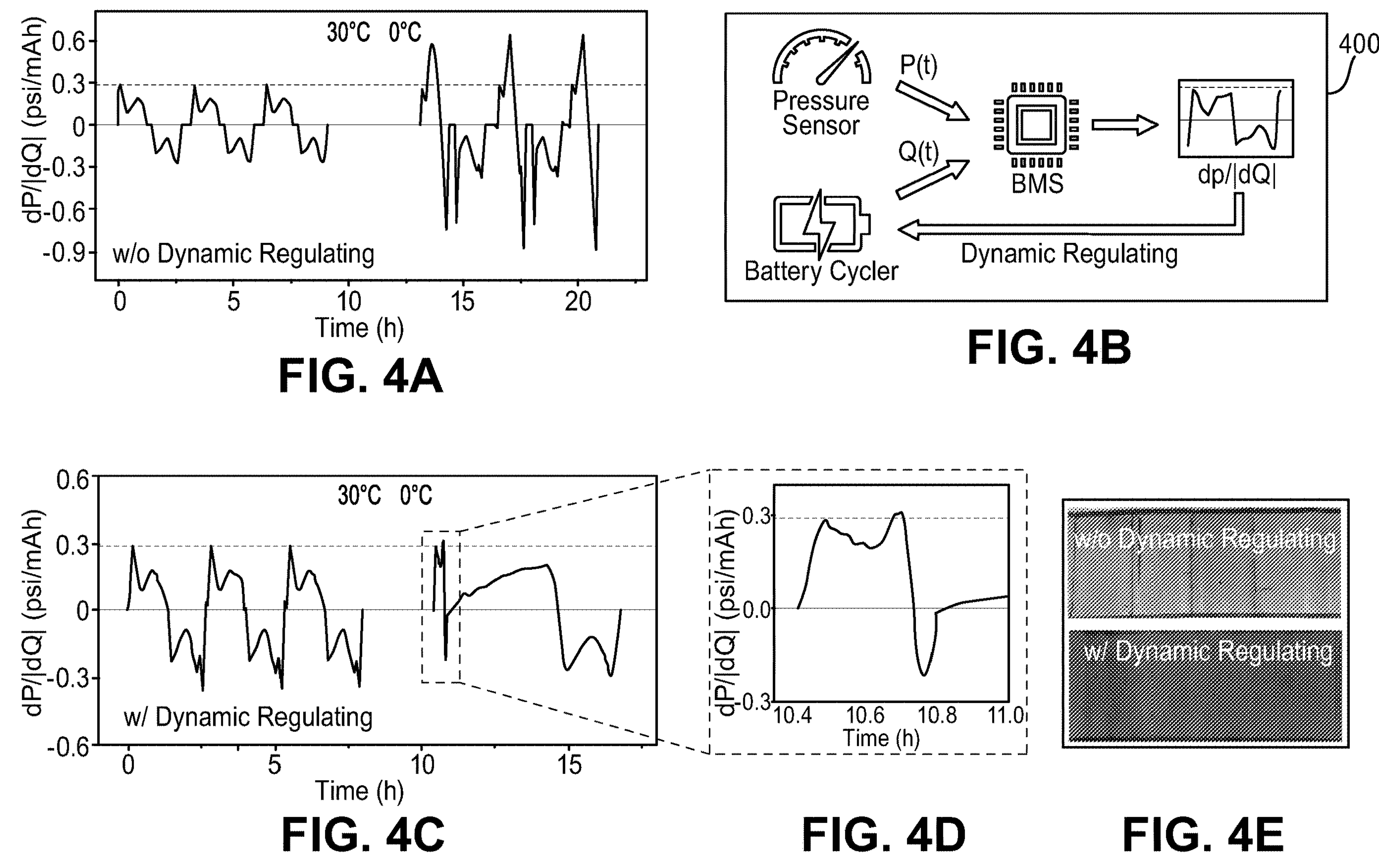
FIGS. 4*a-e* show dynamic charging regulate by dP/dQ avoids catastrophical Li-plating under low temperature.

One application for the onboard detection of Li-plating is providing a solution to the incompetent rigid conventional charging protocol. It costs minimal computational power to calculate real-time dP/dQ value then compare it against the numerical Li-plating threshold, so the detection of Li-plating backed by differential pressure sensing can be easily integrated into any embedded system such as a battery management system. With this added feature, a battery management system can dynamically regulate the charging current so that Li-plating can be terminated at its nucleation stage. As a proof of concept, a Python program to simulate battery management system was developed that retrieves data stream from both load cell and the battery cycler to calculate the dP/dQ value in real-time then dynamically regulate the charging current below the dP/dQ threshold (FIG. 4*b*). The system 400 FIG. 4 includes the battery management system 410 which includes a processor (compare with FIG. 10, processor 1010 with at least one memory 1020) that manages the charging of a battery. In this specific case, if the dP/dQ value exceeds the Li-plating threshold, the dynamic charge regulation kicks in, sending a signal to the battery cycler to turn the current to a safer, slower 0.2 C. With this updated battery management system, the same type of commercial cell is cycled again under the same condition with the same 1 C charging protocol as shown in FIG. 4*c*. At 30° C., the dynamic regulating does not interfere with the charging because Li-plating is not detected. At 0° C., dynamic regulation is triggered to reduces the charging current immediately after the dP/dQ value exceeds the threshold due to Li nucleation. After dynamic regulating taking control, the dP/dQ value drops below the threshold immediately indicating Li-plating is effectively extinguished (FIG. 4*d*). The cell is then opened at charged state in glovebox after 3 dynamically regulated charging cycles (later two cycles not showing here) to show that a golden color of lithiated graphite in $LiC_6$ phase without sign of Li-plating is observed (Maire, P., Evans, A., Kaiser, H., Scheifele, W. & Novak, P. Colorimetric determination of lithium content in electrodes of lithium-ion batteries. J. Electrochem. Soc. 155, 862-865 (2008)), indicating that self-regulated charging can effectively contain Li-plating under an unexpected harsh charging condition.

It has been demonstrated that differential pressure sensing, which measures the pressure change per unit of charge in the battery, is a very powerful tool to distinguish the anode electrochemical process. With the dP/dQ threshold established by the intercalation chemistry of slow charging, the initial nucleation stage of Li-plating was successfully captured in real-time under strenuous charging conditions. This technique utilizes low-cost external force sensor and consumes little computational power, showing great potential of integration with BMS for onboard application. As a proof of concept, it was shown that with this integration, a dynamic-regulated charging protocol can be realized to effectively extinguish Li-plating triggered by low temperature. This method can also serve as alternative to destructive techniques to accelerate the research in the field since the avoidance of Li-plating is a priority in the development of fast charging strategies.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. A system for battery charging comprising: at least one processor; and at least one memory including instructions which when executed causes the at least one processor to a least: determine, based on a first output from a charging source and a second output from a pressure sensor, a differential pressure with respect to charge.

Example 2. The system of Example 1, wherein one or more values of differential pressure with respect to charge are stored in the at least one memory.

Example 3. The system of any of Examples 1-2, further comprising a battery, wherein the pressure sensor is mechanically coupled with a portion of the battery, and the at least one processor is electronically coupled with the pressure sensor and the charging source.

Example 4. The system of any of Examples 1-3, wherein the battery comprises a metal or metal ion selected from group consisting of lithium, sodium, potassium, aluminum, vanadium, iron, cerium, nickel, cadmium, magnesium, zinc, and combinations thereof.

Example 5. The system of any of Examples 1-4, wherein the battery is a lithium ion battery.

Example 6. The system of any of Examples 1-5, wherein the battery is a pouch cell that is expandable.

Example 7. The system of any of Examples 1-6, wherein the pressure sensor is disposed on a surface of the pouch cell, and wherein the pressure sensor and the pouch cell are disposed within a constrained volume by a one or more constraining walls.

Example 8. The system of any of Examples 1-7, wherein a metal plate is disposed between the pouch cell and the pressure sensor.

Example 9. The system of any of Examples 1-8, wherein the battery has a substantially fixed volume and the pressure sensor is disposed internally in the battery.

Example 10. The system of any of Examples 1-9, wherein the at least one processor is further caused to perform one or more measurements to determine a maximum value for differential pressure with respect to charge that is indicative of metal ion plating.

Example 11. The system of any of Examples 1-10, wherein the at least one processor is further caused to at least reduce the rate of charging if a value of a measured differential pressure with respect to charge exceeds the maximum value.

Example 12. A method of charging a battery comprising: determining, based on a first output from a charging source and a second output from a pressure sensor mechanically coupled to a battery, a differential pressure with respect to charge; determining a maximum value of differential pressure with respect to charge; and charging at or below the maximum value of differential pressure with respect to charge until the battery has a target state of charge.

Example 13. The method of Example 12, wherein the battery comprises an metal ion selected from group consisting of lithium, sodium, potassium, aluminum, vanadium, iron, cerium, nickel, cadmium, magnesium, zinc, and combinations thereof.

Example 14. The method of any of Examples 12-13, wherein the battery is a lithium ion battery.

Example 15. The method of any of Examples 12-14, wherein the battery is a pouch cell that is expandable.

Example 16. The method of any of Examples 12-15, wherein the pressure sensor is disposed externally on a surface of the pouch cell and the pressure sensor and the pouch cell are disposed within a constrained volume.

Example 17. The method of any of Examples 12-16, wherein the battery has a substantially fixed volume and the pressure sensor is disposed internally in the battery.

Example 18. The method of any of Examples 12-17, further comprising sending a signal to the charging source to reduce the rate of charging if a value of the differential pressure with respect to charge exceeds the maximum value.

Example 19. A system for onboard battery management in an electric vehicle comprising: at least one onboard processor; and at least one memory including instructions which when executed causes the at least one onboard processor to a least:

determine, based on a first output from a charging source and a second output from a pressure sensor mechanically coupled to a rechargeable car battery, a differential pressure with respect to charge; wherein the at least one onboard processor carries out instructions to determine a differential pressure with respect to charge based on output form the pressure sensor and the charging source during charging; and wherein values of the differential pressure with respect to charge are stored in the at least one memory.

Example 20. The system of Example 20, wherein the rechargeable car battery is a lithium ion battery.

Example 21. The system of any of Examples 19-20, wherein the rechargeable car battery is a pouch cell that is expandable.

Example 22. The system of any of Examples 19-21, wherein the pressure sensor is disposed externally on a surface of the pouch cell and the pressure sensor and the pouch cell are disposed within a constrained volume.

Example 23. The system of any of Examples 19-22, wherein the battery has a fixed volume and the pressure sensor is disposed internally in the battery.

Example 24. The system of any of Examples 19-23, wherein the instructions further cause to be carried out a measurement of a maximum value for the differential pressure with respect to charge, the maximum value indicative of metal ion plating.

Example 25. The system of any of Examples 19-24, wherein the instructions further cause to be sent a signal to the charging source to reduce the rate of charging if a value of the differential pressure with respect to charge exceeds the maximum value.

Although various illustrative embodiments are described above, any of a number of changes may be made to various embodiments. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the claims.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. References to a structure or feature that is disposed "adjacent" another feature may have portions that overlap or underlie the adjacent feature.

Terminology used herein is for the purpose of describing particular embodiments only and is not intended to be limiting. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as, for example, "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings provided herein.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

As used herein in the specification and claims, including as used in the examples and unless otherwise expressly specified, all numbers may be read as if prefaced by the word "about" or "approximately," even if the term does not expressly appear. The phrase "about" "or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, are possible.

In the descriptions above and in the claims, phrases such as, for example, "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of charging a battery comprising:

determining, based on a first output from a charging source and a second output from a pressure sensor mechanically coupled to a battery, a differential pressure with respect to charge;

determining a maximum value of differential pressure with respect to charge; and charging at or below the maximum value of differential pressure with respect to charge until the battery has a target state of charge;

wherein the differential pressure with respect to charge (dP/dQ) is computed from a gradient of pressure with respect to time (dP/dt) and current (I) via dP/dQ=(1/I)(dP/dt).

2. The method of claim 1, wherein the battery comprises an metal ion selected from group consisting of lithium, sodium, potassium, aluminum, vanadium, iron, cerium, nickel, cadmium, magnesium, zinc, and combinations thereof.

3. The method of claim 1, wherein the battery is a lithium ion battery.

4. The method of claim 1, wherein the battery is a pouch cell that is expandable.

5. The method of claim 4, wherein the pressure sensor is disposed externally on a surface of the pouch cell and the pressure sensor and the pouch cell are disposed within a constrained volume.

6. The method of claim 1, wherein the battery has a substantially fixed volume and the pressure sensor is disposed internally in the battery.

7. The method of claim 1, further comprising sending a signal to the charging source to reduce the rate of charging if a value of the differential pressure with respect to charge exceeds the maximum value.

8. A system for onboard battery management in an electric vehicle comprising:

at least one onboard processor; and at least one memory including instructions which when executed causes the at least one onboard processor to at least:

determine, based on a first output from a charging source and a second output from a pressure sensor mechanically coupled to a rechargeable car battery, a differential pressure with respect to charge;

determine a maximum value of differential pressure with respect to charge; and charge the rechargeable car battery at or below the maximum value of differential pressure with respect to charge until the rechargeable car battery has a target state of charge;

wherein the at least one onboard processor carries out instructions to determine a differential pressure with respect to charge based on output from the pressure sensor and the charging source during charging; and wherein values of the differential pressure with respect to charge are stored in the at least one memory;

wherein the differential pressure with respect to charge (dP/dQ) is computed from a gradient of pressure with respect to time (dP/dt) and current (I) via dP/dQ=(1/I)(dP/dt).

9. The system of claim 8, wherein the rechargeable car battery is a lithium ion battery.

10. The system of claim 8, wherein the rechargeable car battery is a pouch cell that is expandable.

11. The system of claim 10, wherein the pressure sensor is disposed externally on a surface of the pouch cell and the pressure sensor and the pouch cell are disposed within a constrained volume.

12. The system of claim 8, wherein the battery has a fixed volume and the pressure sensor is disposed internally in the battery.

13. The system of claim 8, wherein the instructions further cause to be carried out a measurement of a maximum value for the differential pressure with respect to charge, the maximum value indicative of metal ion plating.

14. The system of claim 13, wherein the instructions further cause to be sent a signal to the charging source to reduce the rate of charging if a value of the differential pressure with respect to charge exceeds the maximum value.

15. A system for battery charging comprising:

at least one processor; and at least one memory including instructions which when executed causes the at least one processor to at least:

determine, based on a first output from a charging source and a second output from a pressure sensor, a differential pressure with respect to charge;

determine a maximum value of differential pressure with respect to charge; and charge a battery at or below the maximum value of differential pressure with respect to charge until the battery has a target state of charge;

wherein the differential pressure with respect to charge (dP/dQ) is computed from a gradient of pressure with respect to time (dP/dt) and current (I) via dP/dQ=(1/I)(dP/dt).

16. The system of claim 15, wherein one or more values of differential pressure with respect to charge are stored in the at least one memory.

17. The system of claim 15, further comprising a battery, wherein the pressure sensor is mechanically coupled with a portion of the battery, and the at least one processor is electronically coupled with the pressure sensor and the charging source.

18. The system of claim 17, wherein the battery comprises a metal or metal ion selected from group consisting of lithium, sodium, potassium, aluminum, vanadium, iron, cerium, nickel, cadmium, magnesium, zinc, and combinations thereof.

19. The system of claim 18, wherein the battery is a lithium ion battery.

20. The system of claim 17, wherein the battery is a pouch cell that is expandable.

21. The system of claim 20, wherein the pressure sensor is disposed on a surface of the pouch cell, and wherein the pressure sensor and the pouch cell are disposed within a constrained volume by a one or more constraining walls.

22. The system of claim 21, wherein a metal plate is disposed between the pouch cell and the pressure sensor.

23. The system of claim 17, wherein the battery has a substantially fixed volume and the pressure sensor is disposed internally in the battery.

24. The system of claim 15, wherein the at least one processor is further caused to perform one or more measurements to determine a maximum value for differential pressure with respect to charge that is indicative of metal ion plating.

25. The system of claim 24, wherein the at least one processor is further caused to at least reduce the rate of charging if a value of a measured differential pressure with respect to charge exceeds the maximum value.

* * * * *